United States Patent
Hofmann et al.

(10) Patent No.: US 10,968,527 B2
(45) Date of Patent: Apr. 6, 2021

(54) METHOD FOR EMBEDDING INSERTS, FASTENERS AND FEATURES INTO METAL CORE TRUSS PANELS

(71) Applicant: California Institute of Technology, Pasadena, CA (US)

(72) Inventors: Douglas C. Hofmann, Altadena, CA (US); Scott N. Roberts, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 361 days.

(21) Appl. No.: 15/346,592

(22) Filed: Nov. 8, 2016

(65) Prior Publication Data

US 2017/0137955 A1 May 18, 2017

Related U.S. Application Data

(60) Provisional application No. 62/254,332, filed on Nov. 12, 2015.

(51) Int. Cl.
*C25D 5/56* (2006.01)
*C25D 3/12* (2006.01)
(Continued)

(52) U.S. Cl.
CPC .............. *C25D 5/56* (2013.01); *B29C 64/135* (2017.08); *B29C 70/021* (2013.01); *B29C 70/70* (2013.01); *B29C 70/72* (2013.01); *B29D 99/0089* (2013.01); *B33Y 10/00* (2014.12); *B33Y 80/00* (2014.12); *C23C 18/165* (2013.01); *C23C 18/31* (2013.01); *C25D 3/12* (2013.01);
(Continued)

(58) Field of Classification Search
CPC ........... C25D 5/56; C25D 7/00; C25D 7/0614
See application file for complete search history.

(56) References Cited

U.S. PATENT DOCUMENTS 3,435,512 A 4/1969 Macrobbie
3,519,444 A 7/1970 Brown et al.
(Continued)

FOREIGN PATENT DOCUMENTS

CN 101709773 A 5/2010
CN 102563006 A 7/2012
(Continued)

OTHER PUBLICATIONS

US 9,285,027 B2, 03/2016, Hofmann et al. (withdrawn)
(Continued)

*Primary Examiner* — Christopher T Schatz
(74) *Attorney, Agent, or Firm* — KPPB LLP

(57) ABSTRACT

Systems and method for fabricating a metal core truss panel with seamlessly embedded features in accordance with embodiments of the invention are illustrated. One embodiment includes a method for producing a metal core truss panel composite, the method including fabricating a sacrificial core truss panel including a plurality of interconnected truss members and at least one embedded feature, and plating the sacrificial core truss panel with a layer of metal forming a metal core truss panel including a plurality of interconnected metal truss members and at least one seamlessly embedded metal feature.

17 Claims, 10 Drawing Sheets

(51) Int. Cl.

| | |
|---|---|
| *C25D 7/00* | (2006.01) |
| *B33Y 10/00* | (2015.01) |
| *B33Y 80/00* | (2015.01) |
| *C23C 18/31* | (2006.01) |
| *C23C 18/16* | (2006.01) |
| *B29C 64/135* | (2017.01) |
| *B29C 70/70* | (2006.01) |
| *B29D 99/00* | (2010.01) |
| *B29C 70/02* | (2006.01) |
| *B29C 70/72* | (2006.01) |
| B29K 705/00 | (2006.01) |
| B29L 7/00 | (2006.01) |

(52) U.S. Cl.
CPC ............ *C25D 7/00* (2013.01); *B29K 2705/00* (2013.01); *B29L 2007/002* (2013.01)

(56) References Cited

U.S. PATENT DOCUMENTS

| | | |
|---|---|---|
| 3,529,457 A | 9/1970 | Bowers |
| 3,682,606 A | 8/1972 | Anderson et al. |
| 3,986,412 A | 10/1976 | Farley et al. |
| 4,123,737 A | 10/1978 | Hoagland, Jr. |
| RE29,989 E | 5/1979 | Polk |
| 4,173,393 A | 11/1979 | Maurer |
| 4,202,404 A | 5/1980 | Carlson |
| 4,584,036 A | 4/1986 | Taub et al. |
| 4,670,636 A | 6/1987 | Taub et al. |
| 4,711,795 A | 12/1987 | Takeuchi et al. |
| 4,749,625 A | 6/1988 | Obayashi et al. |
| 4,783,983 A | 11/1988 | Narasimhan |
| 4,810,314 A | 3/1989 | Henderson et al. |
| 4,812,150 A | 3/1989 | Scott |
| 4,823,638 A | 4/1989 | Ishikawa |
| 4,851,296 A | 7/1989 | Tenhover et al. |
| 4,883,632 A | 11/1989 | Goto et al. |
| 4,935,291 A | 6/1990 | Gunnink |
| 5,005,456 A | 4/1991 | Ballard et al. |
| 5,168,918 A | 12/1992 | Okuda et al. |
| 5,185,198 A | 2/1993 | Lefeber et al. |
| 5,288,344 A | 2/1994 | Peker et al. |
| 5,310,432 A | 5/1994 | Yamanaka et al. |
| 5,417,385 A | 5/1995 | Arnold et al. |
| 5,485,761 A | 1/1996 | Rouverol |
| 5,509,978 A | 4/1996 | Masumoto et al. |
| 5,636,550 A | 6/1997 | Deane |
| 5,722,295 A | 3/1998 | Sakai et al. |
| 5,746,844 A | 5/1998 | Sterett et al. |
| 5,772,803 A | 6/1998 | Peker et al. |
| 5,866,272 A | 2/1999 | Westre et al. |
| 5,896,642 A | 4/1999 | Peker et al. |
| 6,162,130 A | 12/2000 | Masumoto et al. |
| 6,273,322 B1 | 8/2001 | Yamamoto et al. |
| 6,620,264 B2 | 9/2003 | Kundig et al. |
| 6,652,679 B1 | 11/2003 | Inoue et al. |
| 6,732,606 B1 | 5/2004 | Zhu et al. |
| 6,771,490 B2 | 8/2004 | Peker et al. |
| 6,843,496 B2 | 1/2005 | Peker et al. |
| 6,887,586 B2 | 5/2005 | Peker et al. |
| 7,052,561 B2 | 5/2006 | Lu et al. |
| 7,073,560 B2 | 7/2006 | Kang et al. |
| 7,075,209 B2 | 7/2006 | Howell et al. |
| 7,323,071 B1 | 1/2008 | Branagan |
| 7,357,731 B2 | 4/2008 | Johnson et al. |
| 7,360,419 B2 | 4/2008 | French et al. |
| 7,497,981 B2 | 3/2009 | Graham et al. |
| 7,500,987 B2 | 3/2009 | Bassler et al. |
| 7,552,664 B2 | 6/2009 | Bulatowicz |
| 7,575,040 B2 | 8/2009 | Johnson |
| 7,862,323 B2 | 1/2011 | Micarelli et al. |
| 7,883,592 B2 | 2/2011 | Hofmann et al. |
| 7,896,982 B2 | 3/2011 | Johnson et al. |
| 7,955,713 B2 | 6/2011 | Roebroeks et al. |
| 8,042,770 B2 | 10/2011 | Martin et al. |
| 8,400,721 B2 | 3/2013 | Bertele et al. |
| 8,418,366 B2 | 4/2013 | Wang et al. |
| 8,485,245 B1 | 7/2013 | Prest et al. |
| 8,496,077 B2 | 7/2013 | Nesnas et al. |
| 8,596,106 B2 | 12/2013 | Tang et al. |
| 8,613,815 B2 | 12/2013 | Johnson |
| 8,789,629 B2 | 7/2014 | Parness et al. |
| 8,986,469 B2 | 3/2015 | Khalifa et al. |
| 9,044,805 B2 | 6/2015 | Prest et al. |
| 9,057,120 B2 | 6/2015 | Pham et al. |
| 9,328,813 B2 | 5/2016 | Hofmann et al. |
| 9,579,718 B2 | 2/2017 | Hofmann |
| 9,610,650 B2 | 4/2017 | Hofmann et al. |
| 9,783,877 B2 | 10/2017 | Hofmann et al. |
| 9,791,032 B2 | 10/2017 | Hofmann et al. |
| 9,868,150 B2 | 1/2018 | Hofmann et al. |
| 9,996,053 B2 | 6/2018 | O'keeffe et al. |
| 10,151,377 B2 | 12/2018 | Hofmann et al. |
| 10,155,412 B2 | 12/2018 | Parness et al. |
| 10,174,780 B2 | 1/2019 | Hofmann et al. |
| 10,690,227 B2 | 6/2020 | Hofmann et al. |
| 10,883,528 B2 | 1/2021 | Hofmann et al. |
| 2002/0053375 A1 | 5/2002 | Hays et al. |
| 2002/0100573 A1 | 8/2002 | Inoue et al. |
| 2002/0184766 A1 | 12/2002 | Kobayashi et al. |
| 2003/0062811 A1 | 4/2003 | Peker et al. |
| 2004/0103536 A1 | 6/2004 | Kobayashi et al. |
| 2004/0103537 A1 | 6/2004 | Kobayashi et al. |
| 2004/0154701 A1 | 8/2004 | Lu et al. |
| 2005/0034792 A1 | 2/2005 | Lu et al. |
| 2005/0084407 A1 | 4/2005 | Myrick |
| 2005/0127139 A1 | 6/2005 | Slattery et al. |
| 2006/0130944 A1 | 6/2006 | Poon et al. |
| 2006/0156785 A1 | 7/2006 | Mankame et al. |
| 2007/0034304 A1 | 2/2007 | Inoue et al. |
| 2007/0144621 A1 | 6/2007 | Farmer et al. |
| 2007/0226979 A1 | 10/2007 | Paton et al. |
| 2007/0253856 A1 | 11/2007 | Vecchio et al. |
| 2008/0085368 A1 | 4/2008 | Gauthier et al. |
| 2008/0099175 A1 | 5/2008 | Chu et al. |
| 2008/0121316 A1 | 5/2008 | Duan et al. |
| 2009/0011846 A1 | 1/2009 | Scott |
| 2009/0078370 A1 | 3/2009 | Sklyarevich et al. |
| 2009/0114317 A1 | 5/2009 | Collier et al. |
| 2009/0194205 A1 | 8/2009 | Loffler et al. |
| 2009/0246398 A1 | 10/2009 | Kurahashi et al. |
| 2009/0288741 A1 | 11/2009 | Zhang et al. |
| 2010/0313704 A1 | 12/2010 | Wang et al. |
| 2011/0048587 A1 | 3/2011 | Vecchio et al. |
| 2011/0154928 A1 | 6/2011 | Ishikawa |
| 2011/0302783 A1 | 12/2011 | Nagata et al. |
| 2012/0006085 A1 | 1/2012 | Johnson et al. |
| 2012/0067100 A1 | 3/2012 | Stefansson et al. |
| 2012/0073710 A1 | 3/2012 | Kim et al. |
| 2012/0077052 A1 | 3/2012 | Demetriou et al. |
| 2012/0289946 A1 | 11/2012 | Steger |
| 2013/0062134 A1 | 3/2013 | Parness et al. |
| 2013/0068527 A1 | 3/2013 | Parness et al. |
| 2013/0112321 A1 | 5/2013 | Poole et al. |
| 2013/0133787 A1 | 5/2013 | Kim |
| 2013/0139964 A1 | 6/2013 | Hofmann et al. |
| 2013/0143060 A1* | 6/2013 | Jacobsen ............... B29C 71/02 428/594 |
| 2013/0309121 A1 | 11/2013 | Prest et al. |
| 2013/0333814 A1 | 12/2013 | Fleury et al. |
| 2014/0004352 A1 | 1/2014 | McCrea et al. |
| 2014/0010968 A1 | 1/2014 | Prest et al. |
| 2014/0020794 A1 | 1/2014 | Hofmann et al. |
| 2014/0030948 A1 | 1/2014 | Kim et al. |
| 2014/0045680 A1 | 2/2014 | Nakayama et al. |
| 2014/0083640 A1 | 3/2014 | Waniuk et al. |
| 2014/0093674 A1 | 4/2014 | Hofmann et al. |
| 2014/0141164 A1 | 5/2014 | Hofmann et al. |
| 2014/0202595 A1 | 7/2014 | Hofmann et al. |
| 2014/0203622 A1 | 7/2014 | Yamamoto et al. |
| 2014/0213384 A1 | 7/2014 | Johnson et al. |
| 2014/0224050 A1 | 8/2014 | Hofmann et al. |
| 2014/0227125 A1 | 8/2014 | Hofmann et al. |

(56) References Cited

U.S. PATENT DOCUMENTS

| | | |
|---|---|---|
| 2014/0246809 A1 | 9/2014 | Hofmann |
| 2014/0293384 A1 | 10/2014 | O'keeffe et al. |
| 2014/0312098 A1 | 10/2014 | Hofmann et al. |
| 2014/0342179 A1 | 11/2014 | Hofmann et al. |
| 2014/0348571 A1 | 11/2014 | Prest et al. |
| 2015/0047463 A1 | 2/2015 | Hofmann et al. |
| 2015/0068648 A1 | 3/2015 | Schroers et al. |
| 2015/0075744 A1 | 3/2015 | Hofmann et al. |
| 2015/0158067 A1 | 6/2015 | Kumar et al. |
| 2015/0289605 A1 | 10/2015 | Prest et al. |
| 2015/0298443 A1* | 10/2015 | Hundley ............ B32B 38/1866 156/214 |
| 2015/0314566 A1 | 11/2015 | Mattlin et al. |
| 2016/0178047 A1 | 6/2016 | Kennett et al. |
| 2016/0186850 A1 | 6/2016 | Hofmann et al. |
| 2016/0258522 A1 | 9/2016 | Hofmann et al. |
| 2016/0263937 A1 | 9/2016 | Parness et al. |
| 2016/0265576 A1 | 9/2016 | Hofmann et al. |
| 2016/0299183 A1 | 11/2016 | Lee |
| 2016/0361897 A1 | 12/2016 | Hofmann et al. |
| 2017/0121799 A1 | 5/2017 | Hofmann et al. |
| 2017/0144225 A1 | 5/2017 | Hofmann |
| 2018/0119259 A1 | 5/2018 | Hofmann et al. |
| 2019/0126674 A1 | 5/2019 | Parness et al. |
| 2019/0154130 A1 | 5/2019 | Hofmann et al. |
| 2019/0170235 A1 | 6/2019 | Hofmann et al. |
| 2019/0177826 A1 | 6/2019 | Hofmann et al. |
| 2019/0195269 A1 | 6/2019 | Hofmann et al. |
| 2020/0318721 A1 | 10/2020 | Hofmann et al. |

FOREIGN PATENT DOCUMENTS

| | | |
|---|---|---|
| CN | 103153502 A | 6/2013 |
| DE | 102010062089 A1 | 5/2012 |
| EP | 0127366 A1 | 5/1984 |
| EP | 1063312 A1 | 12/2000 |
| EP | 1138798 A1 | 10/2001 |
| EP | 1696153 A1 | 8/2006 |
| EP | 1404884 B1 | 7/2007 |
| EP | 1944138 A2 | 7/2008 |
| JP | 60116775 A | 6/1985 |
| JP | 61276762 A | 12/1986 |
| JP | 62227070 A | 10/1987 |
| JP | 09121094 A | 5/1997 |
| JP | 2002045960 A | 2/2002 |
| JP | 2004353053 A | 12/2004 |
| JP | 2007040517 A | 2/2007 |
| JP | 2007040518 A | 2/2007 |
| JP | 2007247037 A | 9/2007 |
| JP | 2008115932 A | 5/2008 |
| JP | 2008264865 A | 11/2008 |
| JP | 2011045931 A | 3/2011 |
| JP | 2012046826 A | 3/2012 |
| JP | 2012162805 A | 8/2012 |
| JP | 2013057397 A | 3/2013 |
| JP | 2013238278 A | 11/2013 |
| JP | 2013544648 A | 12/2013 |
| WO | 2005077560 A1 | 8/2005 |
| WO | 2007038882 A1 | 4/2007 |
| WO | 2008156889 A2 | 12/2008 |
| WO | 2009069716 A1 | 6/2009 |
| WO | 2011159596 A1 | 12/2011 |
| WO | 2012031022 A2 | 3/2012 |
| WO | 2012147559 A1 | 11/2012 |
| WO | 2013138710 A1 | 9/2013 |
| WO | 2013141878 A1 | 9/2013 |
| WO | 2013141882 A1 | 9/2013 |
| WO | 2014004704 A1 | 1/2014 |
| WO | 2014012113 A2 | 1/2014 |
| WO | 2014058498 A3 | 4/2014 |
| WO | 2015042437 A1 | 3/2015 |
| WO | 2015156797 A1 | 10/2015 |

OTHER PUBLICATIONS

Sanders et al., "Stability of Al-rich glasses in the Al—La—Ni system", 2006, Intermetallics, 14, pp. 348-351.
Sun et al., "Fiber metallic glass laminates", Dec. 2010, J. Mater. Res., vol. 25, No. 12, pp. 2287-2291.
International Preliminary Report on Patentability for International Application PCT/US2013/047950, dated Dec. 31, 2014, dated Jan. 8, 2015, 7 Pgs.
International Preliminary Report on Patentability for International Application PCT/US2013/050614, dated Jan. 20, 2015, dated Jan. 29, 2015, 9 Pgs.
International Preliminary Report on Patentability for International Application PCT/US2014/033510, dated Oct. 12, 2016, dated Oct. 20, 2016, 9 Pgs.
International Preliminary Report on Patentability for International Application PCT/US2014/056615, dated Mar. 22, 2016, dated Mar. 31, 2016, 11 Pgs.
International Search Report and Written Opinion for International Application No. PCT/US2013/050614, Completed May 7, 2014, dated May 7, 2014, 12 pgs.
International Search Report and Written Opinion for International Application PCT/US2013/047950, completed Oct. 8, 2013, dated Oct. 10, 2013, 9 pgs.
International Search Report and Written Opinion for International Application PCT/US2014/033510, completed Jan. 8, 2015, dated Jan. 8, 2015, 11 Pgs.
International Search Report and Written Opinion for International Application PCT/US2014/056615, completed Dec. 29, 2014, dated Dec. 30, 2014, 13 Pgs.
"Corrosion of Titanium and Titanium Alloys", Total Materia., printed Feb. 16, 2016 from http://www.totalmateria.com/Article24.htm, published Sep. 2001, 4 pgs.
"Gear", Dictionary.com. Accessed Aug. 30, 2016.
"Group 4 element", Wkipedia. https://en.wikipedia.org/wiki/Group_4_element. Published Jun. 11, 2010. Accessed Aug. 24, 2016.
"Harmonic Drive AG", website, printed from http://harmoncdrive.aero/?idcat=471, Feb. 20, 2014, 2 pgs.
"Harmonic Drive Polymer GmbH", printed Feb. 20, 2014 from http://www.harmonicdrive.de/English/the-company/subsidiaries/harmonic-drive-polymer-gmbh.html, 1 pg.
"Introduction to Thermal Spray Processing", ASM International, Handbook of Thermal Spray Technology (#06994G), 2004, 12 pgs.
Abdeljawad et al., "Continuum Modeling of Bulk Metallic Glasses and Composites", Physical Review Letters, vol. 105, 205503, Sep. 17, 2010, pp. 125503-1-125503-4.
Abrosimova et al., "Crystalline layer on the surface of Zr-based bulk metallic glasses", Journal of Non-Crystalline solids, Mar. 6, 2001, vol. 288, pp. 121-126.
An et al., "Synthesis of single-component metallic glasses by thermal spray of nanodroplets on amorphous substrates", Applied Physics Letters, Jan. 26, 2012, vol. 100, pp. 041909-1-041909-4.
Anstis et al., "A Critical Evaluation of Indentation Techniques for Measuring Fracture Toughness: I, Direct Crack Measurements", Journal of American Ceramic Society, Sep. 1, 1981, vol. 64, No. 8, pp. 533-538.
Ashby et al., "Metallic glasses of structural materials", Scripta Materialia, Feb. 2006, vol. 54, pp. 321-326.
Bakkal, "Sliding tribological characteristics of Zr-based bulk metallic glass under lubricated conditions", Intermetallics, Mar. 19, 2010, vol. 18, pp. 1251-1253.
Bardt et al., "Micromolding three-dimensional amorphous metal structures", J. Mater. Res, Feb. 2007, vol. 22, No. 2, pp. 339-343.
Basu et al., "Laser surface coating of Fe—Cr—Mo—Y—B—C bulk metallic glass composition on AISI 4140 steel", Surface & Coatings Technology, Mar. 15, 2008, vol. 202, pp. 2623-2631.
Boopathy et al., "Near-threshold fatigue crack growth in bulk metallic glass composites", J. Mater. Res., vol. 24, No. 12, pp. 3611-3619, Dec. 2009.
Branagan et al., "Wear Resistant Amorphous and Nanocomposite Steel Coatings", Met. Mater. Trans. A, Apr. 26, 2001, 32A; Idaho National Engineering and Environmental Laboratory, DOI 10.1007/s11661-001-0051-8, 15 pgs., Oct. 1, 2001.

(56) References Cited

OTHER PUBLICATIONS

Cadney et al., "Cold gas dynamic spraying as a method for freeforming and joining materials", Science Direct, Surface & Coatings Technology, Mar. 15, 2008, vol. 202, pp. 2801-2806.
Calin et al., "Improved mechanical behavior of Cu—Ti-based bulk metallic glass by in situ formation of nanoscale precipitates", Scripta Materialia, Mar. 17, 2003, vol. 48, pp. 653-658.
Chen et al., "Elastic Constants, Hardness and Their Implications to Flow Properties of Metallic Glasses", Journal of Non-crystalline Solids, Sep. 1, 1975, vol. 18, pp. 157-171.
Chen et al., "Formation of Micro-Scale Precision Flexures Via Molding of Metallic Glass", Proceeding of the Annual Meeting of the ASPE, Monterey, CA, 2006, pp. 283-286.
Chen et al., "Influence of laser surface melting on glass formation and tribological behaviors of $Zr_{55}Al_{10}Ni_5Cu_{30}$ alloy", J. Mater Res. Oct. 28, 2011, vol. 26, No. 20, pp. 2642-2652.
Cheng, J. B., "Characterization of mechanical properties of FeCrBSiMnNbY metallic glass coatings", J Mater Sci., Apr. 16, 2009, vol. 44, pp. 3356-3363.
Cheng et al., "Correlation of the microstructure and mechanical properties of Zr-based in-situ bulk metallic glass matrix composites", Intermetallics, Sep. 24, 2010, vol. 18, Issue 12, pp. 2425-2430.
Choi et al., "Tribological behavior of the kinetic sprayed $Ni_{59}Ti_{16}Zr_{20}Si_2Sn_3$", Journal of Alloys and Compounds, May 31, 2007, vol. 434-435, pp. 64-67.
Conner et al., "Shear band spacing under bending of Zr-based metallic glass plates", Acta Materialia, Jan. 27, 2004, vol. 52, pp. 2429-2434.
Conner et al., "Shear bands and cracking of metallic glass plates in bending", Journal of Applied Physics, Jul. 15, 2003, vol. 94, No. 2, pp. 904-911.
Dai et al., "A new centimeter-diameter Cu-based bulk metallic glass", Scripta Materialia, Jan. 20, 2006, vol. 54, pp. 1403-1408.
Davis, "Hardness/Strength Ratio of Metallic Glasses", Scripta Metallurgica, Feb. 18, 1975, vol. 9, pp. 431-436.
De Beer et al., "Surface Folds Make Tears and Chips", Physics, Sep. 4, 2012, vol. 100, 3 pgs.
Demetriou et al., "Glassy steel optimized for glass-forming ability and toughness", Applied Physics Letters, Jul. 31, 2009, vol. 95; pp. 041907-1-041907-3; http:/idx.doi.org/10.1063/1.3184792.
Extended European Search Report for European Application No. 14889035.3, Search completed Dec. 4, 2017, dated Dec. 13, 2017, 10 Pgs.
Kim et al., "Design and synthesis of Cu-based metallic glass alloys with high glass forming ability", Journal of Metastable and Nanocrystalline Materials, Sep. 1, 2005, vols. 24-25, pp. 93-96.
Dislich et al., "Amorphous and Crystalline Dip Coatings Obtained from Organometallic Solutions: Procedures, Chemical Processes and Products", Metallurgical and Protective Coatings, Mar. 6, 1981, vol. 77, pp. 129-139.
Duan et al., "Lightweight Ti-based bulk metallic glasses excluding late transition metals", Scripta Materialia, Mar. 2008, vol. 58, pp. 465-468.
Duan et al., "Tribological properties of $Zr_{41.25}Ti_{13.75}Ni_{10}Cu_{12.5}Be_{22.5}$ bulk metallic glasses under different conditions", Journal of Alloys and Compounds, Mar. 2, 2012, 528. pp. 74-78.
Fan et al., "Metallic glass matrix composite with precipitated ductile reinforcement", Applied Physics Letters, Aug. 5, 2002, vol. 81, Issue 6, pp. 1020-1022.
Fleury et al., "Tribological properties of bulk metallic glasses", Materials Science and Engineering, Jul. 2004, vol. A375-377, pp. 276-279.
Fornell et al., "Enhanced mechanical properties and in vitro corrosion behavior of amorphous and devitrified $Ti_{40}Zr_{10}Cu_{38}Pd_{12}$ metallic glass", Journal of the Mechanical Behavior of Biomedical Materials, May 27, 2011, vol. 4, pp. 1709-1717.
Fu et al., "Sliding behavior of metallic glass Part I. Experimental investigations", Wear, Oct. 2001, vol. 250, pp. 409-419.

Ganesan et al., "Bonding behavior studies of cold sprayed copper coating on the PVC polymer substrate", Surface & Coatings Technology, Jul. 10, 2012, vol. 207, pp. 262-269.
Garrett et al., "Effect of microalloying on the toughness of metallic glasses", Applied Physics Letter, Dec. 12, 2012, vol. 101, 241913-1-241913-3.
Gleason Corporation, "Gear Product News", Introducing genesis, The Next Generation in Gear Technology, Apr. 2006, 52 pgs.
Gloriant, "Microhardness and abrasive wear resistance of metallic glasses and nanostructured composite materials", Journal of Non-Crystalline Solids, Feb. 2003, vol. 316, pp. 96-103.
Greer, "Partially or fully devitrified alloys for mechanical properties", Materials and Science and Engineering, May 31, 2001, vol. A304, pp. 68-72.
Greer et al., "Wear resistance of amorphous alloys and related materials", International Materials Reviews, Apr. 1, 2002, vol. 47, No. 2, pp. 87-112.
Ha et al., "Tensile deformation behavior of two Ti-based amorphous matrix composites containing ductile β dendrites", Materials Science and Engineering: A, May 28, 2012, vol. 552, pp. 404-409.
Hale, "Principles and Techniques for Designing Precision Machines", Ph.D. Thesis, Feb. 1999, 493 pgs.
Harmon et al., "Anelastic to Plastic Transition in Metallic Glass-Forming Liquids", Physical Review Letters, Sep. 28, 2007, vol. 99, 135502-1-135502-4.
Haruyama et al., "Volume and enthalpy relaxation in $Zr_{55}Cu_{30}Ni_5Al_{10}$ bulk metallic glass", Acta Materialia, Mar. 2010, vol. 59, pp. 1829-1836.
Hays, C. C., "Microstructure Controlled Shear Band Pattern Formation and Enhanced Plasticity of Bulk Metallic Glasses Containing in situ Formed Ductile Phase Dendrite Dispersions", Physical Review Letters, Mar. 27, 2000, vol. 84, pp. 2901-2904.
Hejwowski et al., "A comparative study of electrochemical properties of metallic glasses and weld overlay coatings", Vacuum, Feb. 2013, vol. 88, pp. 118-123, Feb. 20, 2012.
Hofmann, "Bulk Metallic Glasses and Their Composites: A Brief History of Diverging Fields", Journal of Materials, Jan. 2013, vol. 2013, 7 pgs.
Hofmann, "Shape Memory Bulk Metallic Glass Composites", Science, Sep. 10, 2010, vol. 329, pp. 1294-1295.
Hofmann, D. C., "Development of tough, low-density titanium-based bulk metallic glass matrix composites with tensile ductility", PNAS, Dec. 23, 2008, vol. 105, pp. 20136-20140.
Hofmann et al., "Designing metallic glass matrix composites with high toughness and tensile ductility", Nature Letters, Feb. 28, 2008, vol. 451, pp. 1085-1090.
Hofmann et al., "Improving Ductility in Nanostructured Materials and Metallic Glasses: Three Laws", Material Science Forum, vol. 633-634, 2010, pp. 657-663, published online Nov. 19, 2009.
Hofmann et al., "Semi-solid Induction Forging of Metallic Glass Matrix Composites", JOM, Dec. 2009, vol. 61, No. 12, pp. 11-17, plus cover.
Hong et al., "Microstructural characteristics of high-velocity oxygen-fuel (HVOF) sprayed nickel-based alloy coating", Journal of Alloys and Compounds, Jul. 26, 2013, vol. 581, pp. 398-403.
Hu et al., "Crystallization Kinetics of the $Cu_{47.5}Zr_{74.5}Al_5$ Bulk Metallic Glass under Continuous and Iso-thermal heating", App. Mech. And Materials, vols. 99-100, Sep. 8, 2011, p. 1052-1058.
Huang et al., "Dendritic microstructure in the metallic glass matrix composite $Zr_{56}Ti_{14}Nb_5Cu_7Ni_6Be_{12}$", Scripta Materialia, Mar. 29, 2005, vol. 53, pp. 93-97.
Huang et al., "Fretting wear behavior of bulk amorphous steel", Intermetallics, Jun. 12, 2011, vol. 19, pp. 1385-1389.
Inoue et al., "Cobalt-based bulk glassy alloy with ultrahigh strength and soft magnetic properties", Nature Materials, Sep. 21, 2003, vol. 2, pp. 661-663.
Inoue et al., "Development and applications of late transition metal bulk metallic glasses", Bulk Metallic Glasses, pp. 1-25, 2008.
Inoue et al., "Developments and applications of bulk metallic glasses", Rev. Adv. Mater. Sci., Feb. 28, 2008, vol. 18, No. 1., pp. 1-9.

(56) References Cited

OTHER PUBLICATIONS

Inoue et al., "Preparation of 16 mm diameter Rod of Amorphous $Zr_{65}Al_{7.5}Ni_{10}Cu_{17.5}$ Alloy", Material Transactions, JIM, 1993, vol. 34, No. 12, pp. 1234-1237.

Inoue et al., "Recent development and application products of bulk glassy alloys", Acta Materialia, Jan. 20, 2011, vol. 59, Issue 6, pp. 2243-2267.

Ishida et al., "Wear resistivity of super-precision microgear made of Ni-based metallic glass", Materials Science and Engineering, Mar. 25, 2007, vol. A449-451, pp. 149-154.

Jiang et al., "Low-Density High-Strength Bulk Metallic Glasses and Their Composites: A Review", Advanced Engineering Materials, Nov. 19, 2014, pp. 1-20, DOI: 10.1002/adem.201400252.

Jiang et al., "Tribological Studies of a Zr-Based Glass-Forming Alloy with Different States", Advanced Engineering Materials, Sep. 14, 2009, vol. 1, No. 11, pp. 925-931.

Kahraman et al., "A Feasibility Study on Development of Dust Abrasion Resistant Gear Concepts for Lunar Vehicle Gearboxes", NASA Grant NNX07AN42G Final Report, Mar. 11, 2009, 77 pgs.

Kim, Junghwan et al., "Oxidation and crystallization mechanisms in plasma-sprayed Cu-based bulk metallic glass coatings", Acta Materialia., Feb. 1, 2010, vol. 58, pp. 952-962.

Kim et al., "Amorphous phase formation of Zr-based alloy coating by HVOF spraying process", Journal of Materials Science, Jan. 1, 2001, vol. 36, pp. 49-54.

Kim et al., "Enhancement of metallic glass properties of Cu-based BMG coating by shroud plasma spraying", Science Direct, Surface & Coatings Technology, Jan. 25, 2011, vol. 205, pp. 3020-3026, Nov. 6, 2010.

Kim et al., "Production of $Ni_{65}Cr_{15}P_{16}B4$ Metallic Glass-Coated Bipolar Plate for Fuel Cell by High Velocity Oxy-Fuel (HVOF) Spray Coating Method", The Japan Institute of Metals, Materials Transactions, Aug. 25, 2010, vol. 51, No. 9. pp. 1609-1613.

Kim et al., "Realization of high tensile ductility in a bulk metallic glass composite by the utilization of deformation-induced martensitic transformation", Scripta Materialia, May 3, 2011, vol. 65, pp. 304-307.

Kim et al., "Weldability of $Cu_{54}Zr_{22}Ti_{18}Ni_6$ bulk metallic glass by ultrasonic welding processing", Materials Letters, May 17, 2014, 130, pp. 160-163.

Kobayashi et al., "Fe-based metallic glass coatings produced by smart plasma spraying process", Materials Science and Engineering, Feb. 25, 2008, vol. B148, pp. 110-113.

Kobayashi et al., "Mechanical property of Fe-base metallic glass coating formed by gas tunnel type plasma spraying", ScienceDirect, Surface & Coatings Technology, Mar. 14, 2008, 6 pgs.

Kobayashi et al., "Property of Ni-Based Metallic Glass Coating Produced by Gas Tunnel Type Plasma Spraying", International Plasma Chemistry Society, ISPC 20, 234, Philadelphia, USA, Jul. 24, 2011, Retrieved from: http://www.ispc-conference.org/ispcproc/ispc20/234.pdf.

Kong et al., "Effect of Flash Temperature on Tribological Properties of Bulk Metallic Glasses", Tribol. Lett., Apr. 25, 2009, vol. 35, pp. 151-158.

Kozachkov et al., "Effect of cooling rate on the volume fraction of B2 phases in a CuZrAlCo metallic glass matrix composite", Intermetallics, Apr. 19, 2013, vol. 39, pp. 89-93.

Kuhn et al., "Microstructure and mechanical properties of slowly cooled Zr—Nb—Cu—Ni—Al composites with ductile bcc phase", Materials Science and Engineering: A, Jul. 2004, vol. 375-377, pp. 322-326.

Kuhn et al., "ZrNbCuNiAl bulk metallic glass matrix composites containing dendritic bcc phase precipitates", Applied Physics Letters, Apr. 8, 2002, vol. 80, No. 14, pp. 2478-2480.

Kumar et al., "Bulk Metallic Glass: The Smaller the Better", Advanced Materials, Jan. 25, 2011, vol. 23, pp. 461-476.

Kwon et al., "Wear behavior of Fe-based bulk metallic glass composites", Journal of Alloys and Compounds, Jul. 14, 2011, vol. 509S, pp. S105-S108.

Launey et al., "Fracture toughness and crack-resistance curve behavior in metallic glass-matrix composites", Applied Physics Letters, Jun. 18, 2009, vol. 94, pp. 241910-1-241910-3.

Launey et al., "Solution to the problem of the poor cyclic fatigue resistance of bulk metallic glasses", PNAS Early Edition, pp. 1-6, Jan 22, 2009.

Lee et al., "Effect of a controlled volume fraction of dendritic phases on tensile and compressive ductility in La-based metallic glass matrix composites", Acta Materialia, vol. 52, Issue 14, Jun. 17, 2004, pp. 4121-4131.

Lee et al., "Nanomechanical properties of embedded dendrite phase and its influence on inelastic deformation of $Zr_{55}Al_{10}Ni_5Cu_{30}$ glassy alloy", Materials Science and Engineering A, Mar. 25, 2007, vol. 375, pp. 945-948.

Li et al., "Wear behavior of bulk $Zr_{41}Ti_{14}Cu_{12.5}Ni_{10}Be_{22.5}$ metallic glasses", J. Mater. Res., Aug. 2002, vol. 17, No. 8, pp. 1877-1880.

Lillo et al., "Microstructure, Processing, Performance Relationships for High Temperature Coatings", U.S. Department of Energy, Office of Fossil Energy, under DOE Idaho Operations Office, Contract DE-AC07-051D14517; 22nd Annual Conference on Fossil Energy Materials, Pittsburgh, U.S., 8 pgs., Jul. 1, 2008.

List, A. et al., "Impact Conditions for Cold Spraying of Hard Metallic Glasses", Journal of Thermal Spray Technology, Jun. 1, 2012, vol. 21, No. 3-4, pp. 531-540.

Liu, X. Q., "Microstructure and properties of Fe-based amorphous metallic coating produced by high velocity axial plasma spraying", Science Direct, Journal of Alloys and Compounds, Apr. 23, 2009, vol. 484, pp. 300-307.

Liu et al., "Influence of Heat Treatment on Microstructure and Sliding Wear of Thermally Sprayed Fe-Based Metallic Glass coatings", Tribol. Lett., Mar. 4, 2012, vol. 46, pp. 131-138.

Liu et al., "Metallic glass coating on metals plate by adjusted explosive welding technique", Applied Surface Science, Jul. 16, 2009, vol. 255, pp. 9343-9347.

Liu et al., "Sliding Tribological Characteristics of a Zr-based Bulk Metallic Glass Near the Glass Transition Temperature", Tribol. Lett., Jan. 29, 2009, vol. 33, pp. 205-210.

Liu et al., "Wear behavior of a Zr-based bulk metallic glass and its composites", Journal of Alloys and Compounds, May 5, 2010, vol. 503, pp. 138-144.

Lupoi, R. et al., "Deposition of metallic coatings on polymer surfaces using cold spray", Science Direct, Surface & Coatings Technology, Sep. 6, 2010, vol. 205, pp. 2167-2173.

Ma et al., "Wear resistance of Zr-based bulk metallic glass applied in bearing rollers", Materials Science and Engineering, May 4, 2004, vol. A386, pp. 326-330.

Maddala et al., "Effect of notch toughness and hardness on sliding wear of $Cu_{50}Hf_{41.5}A_{18.5}$ bulk metallic glass", Scripta Materialia, Jul. 6, 2011, vol. 65, pp. 630-633.

Narayan et al., "On the hardness and elastic modulus of bulk metallic glass matrix composites", Scripta Materialia, Jun. 9, 2010, vol. 63, Issue 7, pp. 768-771.

Ni et al., "High performance amorphous steel coating prepared by HVOF thermal spraying", Journal of Alloys and Compounds, Jan. 7, 2009, vol. 467, pp. 163-167, Nov. 29, 2007.

Nishiyama, N. et al., "Recent progress of bulk metallic glasses for strain-sensing devices", Materials Science and Engineering: A, vols. 449-451, Mar. 25, 2007, 79-83.

Oh et al., "Microstructure and tensile properties of high-strength high-ductility Ti-based amorphous matrix composites containing ductile dendrites", Acta Materialia, Sep. 23, 2011, vol. 59, Issue 19, pp. 7277-7286.

Parlar et al., "Sliding tribological characteristics of Zr-based bulk metallic glass", Intermetallics, Jan. 2008, vol. 16, pp. 34-41.

Pauly et al., "Modeling deformation behavior of Cu—Zr—Al bulk metallic glass matrix composites", Applied Physics Letters, Sep. 2009, vol. 95, pp. 101906-1-101906-3.

Pauly et al., "Transformation-mediated ductility in CuZr-based bulk metallic glasses", Nature Materials, May 16, 2010, vol. 9, Issue 6, pp. 473-477.

Ponnambalam, et al., "Fe-based bulk metallic glasses with diameter thickness larger than one centimeter", J Mater Res, Feb. 17, 2004. vol. 19; pp. 1320-1323.

(56) References Cited

OTHER PUBLICATIONS

Porter et al., "Incorporation of Amorphous Metals into MEMS for High Performance and Reliability", Rockwell Scientific Company, Final Report, Nov. 1, 2003, 41 pgs.

Prakash et al., "Sliding wear behavior of some Fe-, Co- and Ni-based metallic glasses during rubbing against bearing steel", Tribology Letters, May 1, 2000, vol. 8, pp. 153-160.

Qiao et al., "Development of plastic Ti-based bulk-metallic-glass-matrix composites by controlling the microstructures", Materials Science and Engineering: A, Aug. 20, 2010, vol. 527, Issues 29-30, pp. 7752-7756.

Ramamurty et al., "Hardness and plastic deformation in a bulk metallic glass", Acta Materialia, Feb. 2005, vol. 53, pp. 705-717.

Revesz et al., "Microstructure and morphology of Cu—Zr—Ti coatings produced by thermal spray and treated by surface mechanical attrition", ScienceDirect, Journal of Alloys and Compounds, Jul. 14, 2011, vol. 509S, pp. S482-S485, Nov. 4, 2010.

Rigney et al., "The Evolution of Tribomaterial During Sliding: A Brief Introduction", Tribol. Lett, Jul. 1, 2010, vol. 39, pp. 3-7.

Roberts et al., "Cryogenic Charpy impact testing of metallic glass matrix composites", Scripta Materialia, Nov. 11, 2011, 4 pgs.

Schuh et al., "A survey of instrumented indentation studies on metallic glasses", J. Mater. Res., Jan. 2004, vol. 19, No. 1, pp. 46-57.

Segu et al., "Dry Sliding Tribological Properties of Fe-Based Bulk Metallic Glass", Tribol. Lett., Apr. 28, 2012, vol. 47, pp. 131-138.

Shen et al., "Exceptionally high glass-forming ability of an FeCoCrMoCBY alloy", Applied Physics, Apr. 5, 2005, vol. 86, pp. 151907-1-151907-3.

Singer et al., "Wear behavior of triode-sputtered MoS2 coatings in dry sliding contact with steel and ceramics", Wear, Jul. 1996, vol. 195, Issues 1-2, pp. 7-20.

Sinmazcelik et al., "A review: Fibre metal laminates, background, bonding types and applied test methods", Materials and Design, vol. 32, Issue 7, 3671, Mar. 4, 2011, pp. 3671-3685.

Song et al., "Strategy for pinpointing the formation of B2 CuZr in metastable CuZr-based shape memory alloys", Acta Materialia, Aug. 6, 2011, vol. 59, pp. 6620-6630.

Sundaram et al., "Mesoscale Folding, Instability, and Disruption of Laminar Flow in Metal Surfaces", Physical Review Letters, Sep. 7, 2012, vol. 109, pp. 106001-1-106001-5.

Szuecs et al., "Mechanical Properties of $Zr_{56.2}Ti_{13.8}Nb_{5.0}Cu_{6.9}Ni_{5.6}Be_{12.5}$ Ductile Phase Reinforced Bulk Metallic Glass Composite", Acta Materialia, Feb. 2, 2001, vol. 49, Issue 9, pp. 1507-1513.

Tam et al., "Abrasion resistance of Cu based bulk metallic glasses", Journal of Non-Crystalline Solids, Oct. 18, 2004, vol. 347, pp. 268-272.

Tam et al., "Abrasive wear of $Cu_{60}Zr_{30}Ti_{10}$ bulk metallic glass", Materials Science and Engineering, Apr. 1, 2004, vol. A384 pp. 138-142.

Tan et al., "Synthesis of La-based in-situ bulk metallic glass matrix composite", Intermetallics, Nov. 2002, vol. 10, Issues 11-12, pp. 1203-1205.

Tao et al., "Effect of rotational sliding velocity on surface friction and wear behavior in Zr-based bulk metallic glass", Journal of Alloys and Compounds, Mar. 4, 2010, vol. 492, pp. L36-L39.

Tao et al., "Influence of isothermal annealing on the micro-hardness and friction property in CuZrAl bulk metallic glass", Advanced Materials Research, Jan. 1, 2011, vols. 146-147, pp. 615-618.

Tobler et al., "Cryogenic Tensile, Fatigue, and Fracture Parameters for a Solution-Annealed 18 Percent Nickel Maraging Steel", Journal of Engineering Materials and Technology, Apr. 1, 1978, vol. 100, pp. 189-194.

Wagner, "Mechanical Behavior of 18 Ni 200 Grade Maraging Steel at Cyrogenic Temperatures", J Aircraft, Nov. 1, 1986, vol. 23, No. 10, pp. 744-749.

Wang et al., "Progress in studying the fatigue behavior of Zr-based bulk-metallic glasses and their composites", Intermetallics, Mar. 6, 2009, vol. 17, pp. 579-590.

Wikipedia, "Harmonic Drive", printed Feb. 20, 2014, 4 pgs.

Wu et al., "Bulk Metallic Glass Composites with Transformation-Mediated Work-Hardening and Ductility", Adv. Mater., Apr. 26, 2010, vol. 22, pp. 2770-2773.

Wu et al., "Dry Sliding tribological behavior of Zr-based bulk metallic glass", Transactions of Nonferrous Metals Society of China, Jan. 16, 2012, vol. 22, Issue 3, pp. 585-589.

Wu et al., "Effects of environment on the sliding tribological behaviors of Zr-based bulk metallic glass", Intermetallics, Jan. 27, 2012, vol. 25, 115-125.

Wu et al., "Formation of Cu—Zr—Al bulk metallic glass composites with improved tensile properties", Acta Materialia 59, Feb. 19, 2011, pp. 2928-2936.

Wu et al., "Use of rule of mixtures and metal volume fraction for mechanical property predictions of fibre-reinforced aluminum laminates", Journal of Materials Science, vol. 29, issue 17, 4583, Jan. 1994, 9 pages.

Yin, Enhuai et al., "Microstructure and mechanical properties of a spray-formed Ti-based metallic glass former alloy", Journal of Alloys and Compounds, Jan. 25, 2012, vol. 512, pp. 241-245.

Zachrisson et al., "Effect of Processing on Charpy impact toughness of metallic glass matrix composites", Journal of Materials Research, vol. 26, No. 10, May 28, 2011; abstract; p. 1263, paragraphs 2-3; p. 1265, col. 2, paragraph 2.

Zhang et al., "Abrasive and corrosive behaviors of Cu—Zr—Al⇒Ag—Nb bulk metallic glasses", Journal of Physics: Conference Series, 2009, vol. 144, pp. 1-4.

Zhang et al., "Robust hydrophobic Fe-based amorphous coating by thermal. spraying", Appl. Phys. Lett., Sep. 20, 2012, vol. 101, pp. 121603-1-121603-4.

Zhang et al., "Wear behavior of a series of Zr-based bulk metallic glasses", Materials Science and Engineering, Feb. 25, 2008, vol. A475, pp. 124-127.

Zhou et al., "Microstructure and Electrochemical Behavior of Fe-Based Amorphous Metallic Coatings Fabricated by Atmospheric Plasma Spraying", Journal of Thermal Spray Technology, Jan. 2011, vol. 20, No. u-2, pp. 344-350, Aug. 17, 2010.

Zhu et al., "Ta-particulate reinforced Zr-based bulk metallic glass matrix composite with tensile plasticity", Scripta Materialia, Mar. 2010, vol. 62, Issue 5, pp. 278-281.

Zhuo, Longchao, "Spray formed Al-based amorphous matrix nanocomposite plate", ScienceDirect, Journal of Alloys and Compounds, Mar. 1, 2011, vol. 509, pp. L169-L173.

Adharapurapu, et al., "Fracture of Ti—Al3Ti metal-intermetallic laminate composites: Effects of lamination on resistance-curve behavior", Metallurgical and Materials Transactions A, 2005, 36A, 3217-3236.

Demetriou, et al., "Glassy Steel Optimized for Glass-Forming ability and toughness", Applied Physics Letters 95, 041907.

Zheng et al., "Processing and Behavior of Fe-Based Metallic Glass Components via Laser-Engineered Net Shaping", Metallurginacal and Materials Transactions A, 40A, 1235-1245.

Roberts, "Developing and Characterizing Bulk Metallic Glasses for Extreme Applications", XP055731434, Retrieved from the Internet (Dec. 16, 2013): URL:https://thesis.library.caltech.edu/8049/141/Scott_Roberts_thesis_2013_Complete_ Thesis. pdf [retrieved on Sep. 17, 2020].

Cheung et al., "Thermal and mechanical properties of Cu—Zr—Al bulk metallic glasses", Journal of Alloys and Compounds 434-435 (2007) 71-74.

Davis, "Gear Materials, Properties, and Manufacture", ASM International 2005 Chapters 1-3 pp. 1-76.

Jiang et al., "Microstructure evolution and mechanical properties of Cu46Zr47Al7 bulk metallic glass composite containing CuZr crystallizing phases", Materials Science and Engineering A 467 (2007) 139-145.

Yokoyama et al., "Relations between the Thermal and Mechanical Properties of Cast Zr—TM—Al (TM: Cu, Ni, or Co) Bulk Glassy Alloys", Materials Transactions, vol. 48, No. 7 (2007) pp. 1846-1849.

\* cited by examiner

METHOD FOR EMBEDDING INSERTS, FASTENERS AND FEATURES INTO METAL CORE TRUSS PANELS

CROSS-REFERENCE TO RELATED APPLICATIONS

The current application claims the benefit of and priority under 35 U.S.C. § 119(e) to U.S. Provisional Patent Application Ser. No. 62/254,332 to Hofmann et al. entitled "A Method for Embedding Inserts, Fasteners and Features into Metal Core Truss Panels", filed Nov. 12, 2015, which is incorporated herein by reference in its entirety for all purposes.

STATEMENT REGARDING FEDERALLY SPONSORED RESEARCH OR DEVELOPMENT

The invention described herein was made in the performance of work under a NASA contract NNN12AA01C, and is subject to the provisions of Public Law 96-517 (35 USC 202) in which the Contractor has elected to retain title.

FIELD OF THE INVENTION

The present invention generally relates to methods for embedding features into core truss panels.

BACKGROUND

In materials engineering, materials with a high strength-to-weight ratio are highly desired. The lower weight allows for reduced costs in transportation, operational use, and, in some instances, fabrication of the material. Recently, there is an increasing availability of new composite materials that are designed to surpass conventional, monolithic materials in terms of lower densities and higher structural strengths. Composite materials can be defined as structures made through the combination of two or more materials. The combined composite typically has significantly different physical and/or chemical characteristics from the individual materials. A very common example of a composite material is concrete. Concrete is typically made of steel reinforcement bars surrounded by cured cement. Steel reinforcement bars alone would flex too much while cement alone would easily crack without the structural support of steel reinforcement bars. However, when combined to create a composite, an extremely rigid material is created.

Another class of composite materials includes multi-layered composites designed to have a high strength-to-weight ratio. These composite materials are typically made up of an ultra-low density core panel and two face sheet panels on either side of the core panel. To achieve a high strength-to-density ratio, ultra-low density core panels are typically designed to have an ordered structure with a high surface area per unit volume and significant, open porosity. For example, many core panels are designed to have honeycomb structures, which are structures made up of vertical walls arranged in tessellating hexagonal columns. This arrangement allows for a structure with minimal density while maintaining a relatively high compressive strength with respect to forces acting on the axis normal to the panel. Another example of an ultra-low density structure is a truss structure. Truss structures are typically defined as three-dimensional frames composed of linear truss members interconnected in an ordered pattern. This ordered pattern results in a structure with minimal density and high tensile and compressive strengths with respect to all axes.

Common examples of composite materials that are widely used in lightweight engineering applications are carbon fiber composites. Carbon fiber is a low density material with high strength that can be combined with other materials in many ways to form panels or other structures for engineering applications. For example, carbon fiber panel sheets can be combined with an aluminum honeycomb core to produce a multi-layered composite material that serves as an excellent, lower-density replacement for monolithic metals.

SUMMARY OF THE INVENTION

Systems and methods for fabricating a metal core truss panel with seamlessly embedded features in accordance with embodiments of the invention are illustrated. One embodiment includes a method for producing a metal core truss panel composite, the method including fabricating a sacrificial core truss panel including a plurality of interconnected truss members and at least one embedded feature, and plating the sacrificial core truss panel with a layer of metal forming a metal core truss panel including a plurality of interconnected metal truss members and at least one seamlessly embedded metal feature.

In another embodiment, the method includes providing an amount of uncured monomer, and curing the amount of uncured monomer into cured polymer, wherein the cured polymer forms the plurality of interconnected truss members and the at least one embedded feature.

In a further embodiment, the method includes removing the sacrificial core truss panel leaving behind the metal core truss panel including a plurality of interconnected hollow metal truss members and the at least one seamlessly embedded hollow metal feature.

In still another embodiment, the method includes providing an amount of uncured monomer, curing the amount of uncured monomer into cured polymer, wherein the cured polymer forms the plurality of interconnected truss members, providing a feature, and attaching the feature to a section of the plurality of interconnected truss member.

In a still further embodiment, the method includes removing the sacrificial core truss panel leaving behind the metal core truss panel including a plurality of interconnected hollow metal truss members and the at least one seamlessly embedded metal feature.

In yet another embodiment, the feature includes an insert core truss panel and an embedded feature, wherein attaching the feature includes removing a portion of the sacrificial core truss panel, wherein the removed portion is the same size as the insert core truss panel, and bonding the insert core truss panel into the sacrificial core truss panel where the removed portion used to be.

In a yet further embodiment, the insert core truss panel includes a plurality of insert interconnected truss members with each of the insert interconnected truss members having an approximately similar diameter as each of the plurality of interconnected truss members.

In another additional embodiment, the uncured monomer is cured using stereolithography fabrication and the feature is provided by 3D printing fabrication.

In a further additional embodiment, fabricating a sacrificial core truss panel includes providing an amount of uncured monomer, providing a feature, placing the feature into the amount of uncured monomer, and curing the amount of uncured monomer into cured polymer, wherein the cured polymer forms the plurality of interconnected truss members, wherein the feature is embedded in the plurality of interconnected truss members.

In another embodiment again, the feature includes a type of metal.

In a further embodiment again, the type of metal is selected from the group consisting of metallic glass, Al, Ti, Ni, and Au.

In still yet another embodiment, at least one of the at least one embedded feature is selected from the group consisting of an insert, a flexure, a latch, a hook, and a bolting device.

In a still yet further embodiment, the at least one embedded feature includes undersized screw threads such that plating the sacrificial core truss panel forms at least one seamlessly embedded metal feature including standard sized metal screw threads.

In still another additional embodiment, the sacrificial truss panel is plated using a method selected from the group consisting of electroplating, electrolessly plating, and sputtering.

In a still further additional embodiment, the method includes filling in hollow spaces between the plurality of interconnected metal truss members with a type of material.

In still another embodiment again, the method includes filling in the plurality of interconnected hollow metal truss members with a type of material.

In a still further embodiment again, the method includes attaching a face sheet to the metal core truss panel, the face sheet defining a hole that allows access to the at least one seamlessly embedded metal feature.

In yet another additional embodiment, the face sheet includes a carbon fiber laminate material.

In a yet further additional embodiment, the carbon fiber laminate material includes at least one embedded layer of metallic glass.

In yet another embodiment again, the face sheet includes a material selected from the group consisting of metallic glass, monolithic metal, and metal alloy.

In a yet further embodiment again, the face sheet includes a monolithic metal selected from the group consisting of Al, Ti, W, Mo, Ta, V, Nb, Cu, Ni and Fe.

In another additional embodiment again, the sacrificial core truss panel is curved.

In a further additional embodiment again includes a method for producing a metal core truss panel composite, the method including fabricating a sacrificial core truss panel including a plurality of interconnected truss members, plating the sacrificial core truss panel with a layer of metal forming a metal core truss panel including a plurality of interconnected metal truss members, attaching a face sheet to the metal core truss panel, drilling a hole through the face sheet and into the metal core truss panel, providing a feature, inserting the feature into the drilled hole, and bonding the feature to the metal core truss panel.

In still yet another additional embodiment, the drilled hole includes an outer perimeter and the feature includes expanding features that extend beyond the outer perimeter of the drilled hole for latching.

In a still yet further additional embodiment, the layer of metal is an amorphous metal, also known as a metallic glass.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Turning now to the drawings, methods for embedding inserts, fasteners, and features into metal core truss panels are illustrated. A composite material can be formed by attaching a face sheet panel to each side of a metal core truss panel. A core truss panel is typically a three-dimensional structure that includes interconnected and intersecting linear truss members extending in at least three different axes. The truss members can be arranged in an ordered pattern and, depending on the number of axes in which the truss members extend, form repeating tetrahedral units, repeating octahedral units, or any other structure capable of tessellation. In some embodiments, the truss members are hollowed. The ordered pattern and/or hollow nature of the truss members allows formation of a core truss panel that can be characterized as having ultra-low density, high strength-to-density ratio, high surface-to-volume ratio, and high porosity (open volume fraction). The degree of these characteristics depends on several factors, such as but not limited to, the chosen tessellated pattern, the inner and outer diameters of the truss members, and the material used in fabrication.

In many engineering applications, features can be used to provide a number of capabilities and functions. Features can include a wide variety of components. For example, in U.S. patent application Ser. No. 15/067,561, Hofmann et al. discloses a variety of inserts for structurally interrelating components. The disclosure of U.S. patent application Ser. No. 15/067,561 is hereby incorporated by reference in its entirety. In other examples, engineered structures can contain simple fasteners, such as screw devices and bolt devices, which allow panels of materials to be attached. Other features can include but are not limited to latches, flexures, hooks, cabling, bolts, and fins.

In traditional applications, many engineered parts are typically formed from monolithic metals, such as titanium, steel, or aluminum. The mechanical robustness of these monolithic metals allows for bolt holes, screw holes, or other fastening devices to be machined directly into the material without substantially affecting the structural integrity. This traditional approach does not translate well into many classes of composite materials. As composite materials are typically made up of different materials and different layers, they cannot easily be machined or threaded without adversely affecting the structural integrity of the interface between the different materials.

Figure 1:
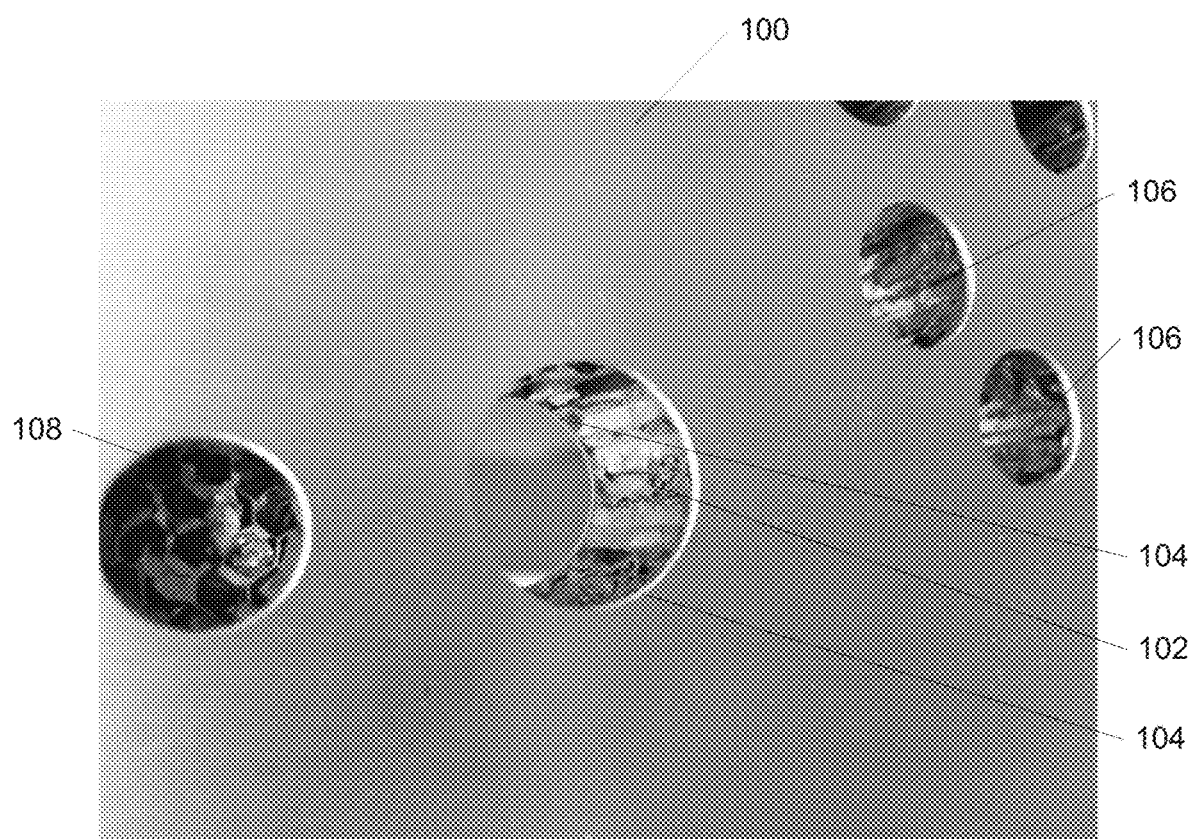
FIG. 1 illustrates a composite panel with drilled holes exposing the interior core panel.

For example, carbon fiber composites have limitations in terms of embedding fasteners and other features. They cannot easily be machined or threaded and are prone to fracture if over-machined. Since complex features cannot be directly machined into carbon fiber composites, a typical practice for embedding these features is to drill a simple cylindrical hole into the panel and then insert and epoxy bond a pre-shaped metal insert into the cylindrical hole. FIG. 1 shows a composite material 100 made of a honeycomb core panel 102 sandwiched between two face sheet panels 104. Several through holes 106 are shown where inserts can be placed and bonded in. The core panel's honeycomb structure can be seen clearly in the leftmost through hole 108.

Figures 2A, 2B, 2C:
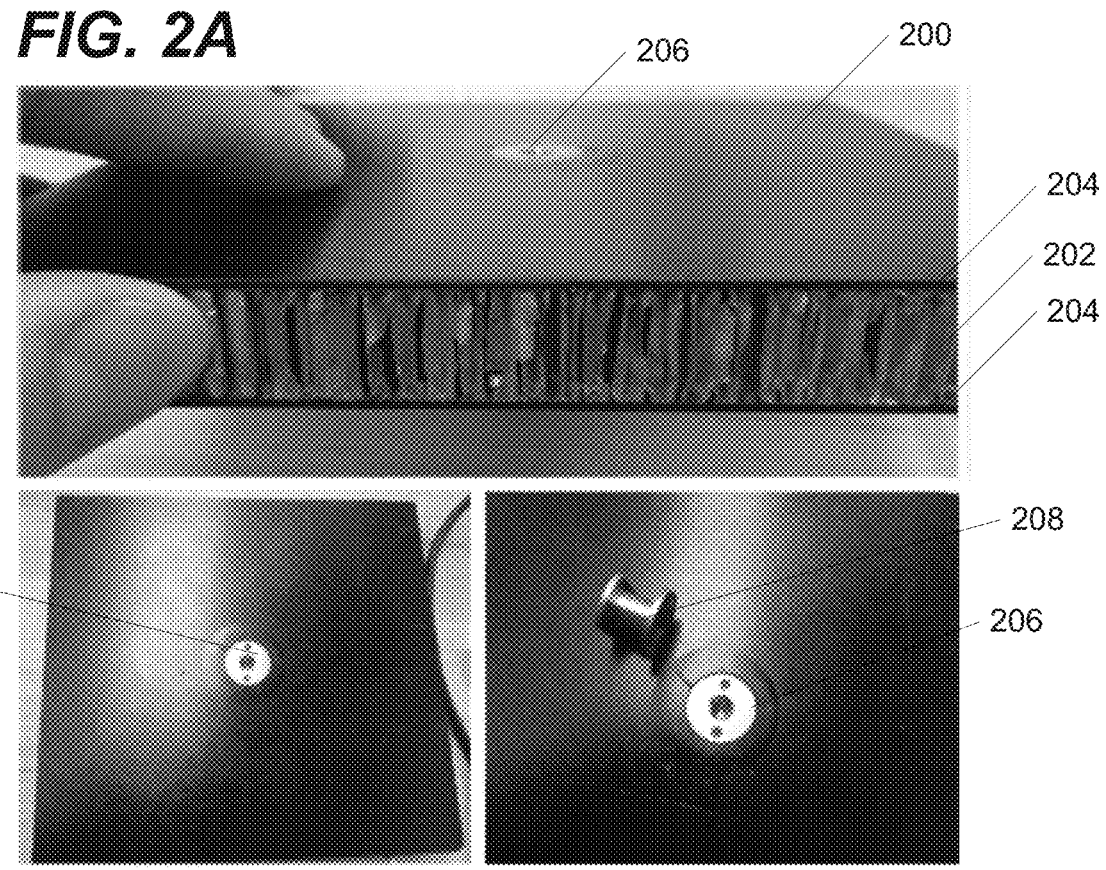
FIG. 2A-C illustrate a carbon fiber-aluminum composite with both an embedded insert and a detached insert.

Metal inserts can be machined to be threaded to receive a joining bolt or any other feature that is difficult to machine in a composite material. The metal inserts are typically monolithic and mechanically robust enough to survive being screwed into repeatedly with a bolt or other fasteners. FIGS. 2A-2C show a carbon fiber-aluminum composite 200 made up of an aluminum honeycomb core panel 202 sandwiched between two carbon fiber face sheets 204 with an embedded metal insert 206. A sideview of a detached metal insert 208 can be seen in FIG. 2C. This technique of embedding metal inserts introduces a new problem where excessive load in the joined parts causes the epoxy bond adhesion to mechanically fail, resulting in the metal insert being dislodged from the composite panel. This mechanically failure is independent of the composite material's characteristics and, therefore, is typically a bottleneck in the stress capacity of the embedded inserts. One method of preventing the "pull-out" phenomenon is to fabricate a composite material that has the feature intimately and seamlessly bonded with the composite material. Another problem with conventional metal inserts is that they are typically machined from a block of metal. Machining these metal inserts is time consuming, especially when the inserts contain threaded holes and complicated surface features such as threads and undercuts.

Embodiments of the present invention disclose methods of fabricating core truss panels that have intimately embedded features. The features are typically made of the same material as the core truss panel and are intimately embedded into the core truss panel such that the features are seamlessly connected to the truss structure. This seamless connection prevents the "pull-out" phenomenon by eliminating the epoxy bond bottleneck, allowing load to be better dispersed throughout the structure.

A core truss panel with seamlessly embedded features can be fabricated using a variety of methods. In many embodiments, a metal core truss panel is formed by plating a sacrificial core truss panel with metal. In further embodiments, the sacrificial core truss panel is removed, leaving behind a free-standing hollow metal core truss panel with the same features as the sacrificial core truss panel. In other embodiments, the sacrificial core truss panel is plated with a composite material. In some embodiments, the features are fabricated into the sacrificial core truss panel before the plating process. In a variety of embodiments, the features are fabricated separately and added into the sacrificial core truss panel before the plating process.

In many embodiments, the metal core truss panel is attached to face sheet panels. Face sheet panels can be made of a variety of materials. In some embodiment, the face sheet panel is made of a monolithic metal. In a number of embodiments, the face sheet panel is made of a carbon fiber laminate material. In further embodiments, the face sheet panel is made of a carbon fiber laminate material with layers of metallic glass embedded in the carbon fiber. The face sheet panels can include drilled holes to match the placement of the features, allowing external access to the features.

The fabrication methods for embedding inserts, fasteners, and features into metal core truss panels in accordance with embodiments of the invention are discussed further below.

Fabrication of a Sacrificial Core Truss Panel

A sacrificial core truss panel can be fabricated using any method that allows for the construction of a three-dimensional object, including the methods described below. The sacrificial core truss panel can be made of any material capable of being fabricated to form a truss pattern, such as but not limited to polymers, metals, composites, concrete, and wood. In many embodiments, the sacrificial core truss panel is made of a type of polymer that is chosen for its dissolvability or its ability to be converted into a different material via burning.

In a variety of embodiments, the sacrificial core truss panel is fabricated using conventional three-dimensional printing methods. Conventional three-dimensional printing methods are typically additive processes used to create three-dimensional objects by laying down and curing successive layers of material, typically a type of polymer. In some embodiments, light and/or heat can be used to cure and/or bond the layers of materials together. In other embodiments, the layers of materials can inherently bond with each other.

Figure 3:
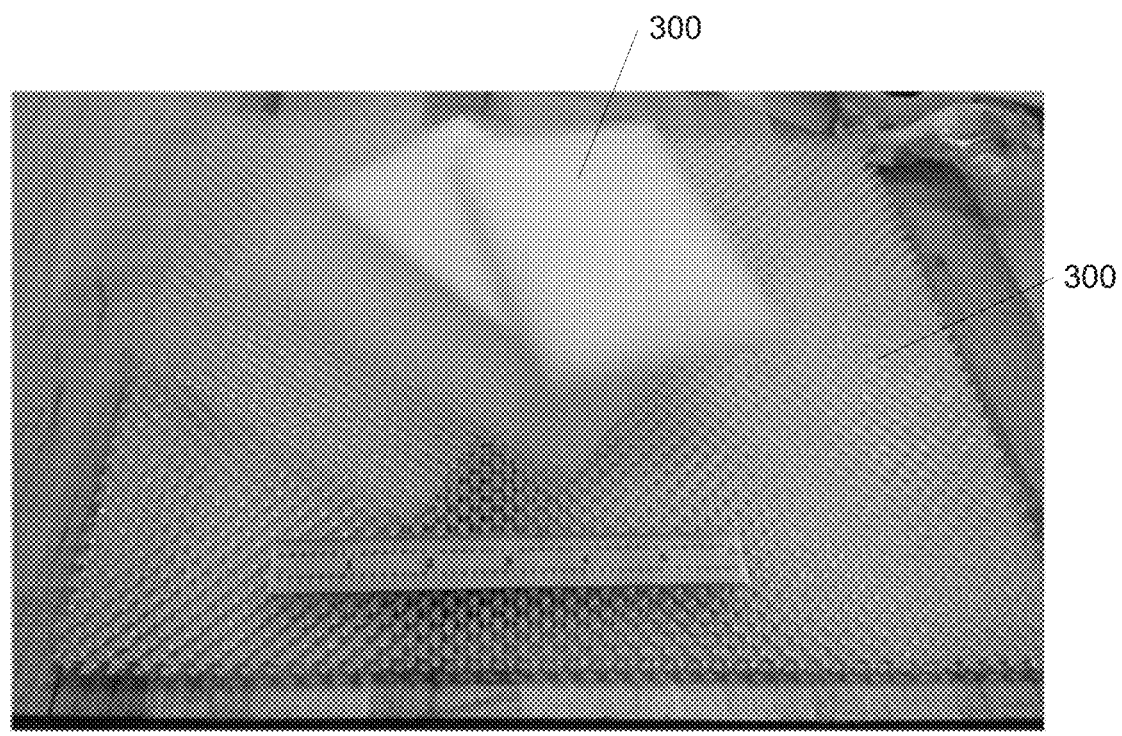
FIG. 3 conceptually illustrates several fabricated polymer core truss panels in accordance with an embodiment of the invention.

In a number of embodiments, the sacrificial core truss panel is fabricated using stereolithography. In stereolithography, a photomonomer resin, typically in liquid or semi-solid form, can be used as building material. Photomonomer resins are photosensitive monomers that can be polymerized when exposed to their respective appropriate wavelength range, typically of the ultraviolet spectrum. During stereolithography fabrication, a computer-controlled laser can be used to polymerize, or cure, patterns of photomonomers to create solid polymer layers that are bonded to the previous cured layer. Several polymer sacrificial core truss panels 300 fabricated using stereolithographic techniques and conventional 3D printing in accordance with some embodiments of the invention are shown in FIG. 3.

In many embodiments, the sacrificial core truss panel is fabricated using self-propagating polymer waveguides. Self-propagating polymer waveguides can enable rapid fabrication of periodic truss structures compared to other lithographic techniques. The method typically involves placing a mask with at least one aperture, typically circular, over a volume of photomonomer. A collimated light source can then be directed through the mask to polymerize a specific portion of the liquid monomer into a solid polymer at the point of exposure to the light. Subsequent incident light can be trapped in the solid polymer due to internal reflection caused by the refractive index change between the uncured monomer and cured polymer, preventing the surrounding monomer from polymerization. The photomonomer can be chosen for its refractive index change between the cured and uncured stages to allow for internal reflection at certain angles of incidence. This self-trapping effect can direct the light towards the far end of the already-formed polymer, turning the already-formed polymer into a truss member that can act as a waveguide. When the light reaches the far end of the already-formed polymer, further polymerization can occur, extending the already-formed polymer in the direction of the light until the desired length is achieved or the monomer reservoir's depth is reached. After the exposure period, excess monomer can be rinsed off.

Several characteristics of the core truss panel can be engineered during the light exposure phase. The length of the truss members can be controlled by modifying the exposure time. The diameter of the truss members can be controlled by changing the aperture's size and/or exposure time. The shape of the aperture can determine the shape of the truss members, or waveguides. In many embodiments, the aperture is circular, resulting in substantially cylindrical truss members. In other embodiments, the aperture is a square, resulting in truss members with a substantially rectangular prism shape. The angle of the truss members, or waveguides, can be controlled through the incident angle of the collimated light with respect to the mask surface. In a number of embodiments, several collimated light sources are concurrently directed through several apertures in the mask at different, calculated angles to form a desired core truss panel pattern. In some embodiments, one collimated light source is used successively to create the desired pattern. Numerous patterns can be created depending on several factors including but not limited to the angles used, the number of different angles used, and the placement of the apertures. In a variety of embodiments, the core truss panel pattern includes repeating tetrahedral units. In further embodiments, the core truss panel pattern includes repeating octahedral units.

Fabrication of a Metal Core Truss Panel

A metal core truss panel can be fabricated using any number of methods including those described below. In many embodiments, the metal core truss panel is fabricated by plating a sacrificial core truss panel. In some embodiments, the sacrificial core truss panel is removed after the plating process, leaving behind a free-standing hollow metal core truss panel. In further embodiments, the sacrificial core truss panel is made of a polymer designed to be easily dissolvable/etched and is removed from the metal core truss panel by using a dissolving/etching agent. A sacrificial core truss panel can be plated using any number of methods including those described below. Plating processes typically involves coating a substrate, the sacrificial core truss panel in this case, with a layer of material. Depending on the plating process used, many types of metals, alloys, and composites can be used to coat the substrate.

In many embodiments, electroplating is used to plate the sacrificial core truss panel with a layer of metal. In further embodiments, the sacrificial core truss panel is electroplated with a layer of nickel. Electroplating refers to a process that can be used to deposit a layer of material, usually a non-reactive metal, onto a conductive substrate without damaging the substrate. A typically setup can involve immersing the substrate and the target metal in an aqueous metal solution and providing a direct current to the target metal, oxidizing the metal into dissolved metal ions. Simultaneously, the metal ions in the aqueous solution can be reduced and deposited onto the substrate, "plating" it. In some embodiments, the sacrificial core truss panel is covered with a conductive seed layer, such as but not limited to a copper layer, before the plating.

In a number of embodiments, electroless nickel plating is used to plate the sacrificial core truss panel. In further embodiments, the sacrificial core truss panel is electrolessly plated with a layer of nickel-phosphorus. Electroless nickel plating refers to a process that can be used to deposit a layer of material, typically a nickel alloy, onto a substrate without the use of an electrical current. The process typically includes a pretreatment cleaning of the substrate to prepare it for plating. Then, a reducing agent can be used to react with metal ions to deposit the metal onto the substrate through an autocatalytic chemical reaction. Although electroless plating is usually used to deposit a nickel-phosphorus alloy, it can also be used to plate a substrate with a composite coating. In a more recent embodiment, aluminum plating has been developed to plate the sacrificial core truss panel with low-density material.

In a variety of embodiments, the sacrificial core truss panel is plated with a layer of metal using sputter coating. Sputter coating typically involves coating a substrate with a source material through ejection of source material onto the substrate. The sputtering process can include placing the substrate to be coated and source material into a vacuumed chamber and introducing an inert gas. A negative charge can then be applied to source material, causing electrons to flow through the environment. The electrons can collide with the inert gas, knocking off electrons from the inert gas. The now positively charged gas can be attracted to the negatively charged source material. This attraction can cause a high velocity bombardment of the source material, causing ejection of the source material, which is then deposited onto the substrate.

Figure 4A:
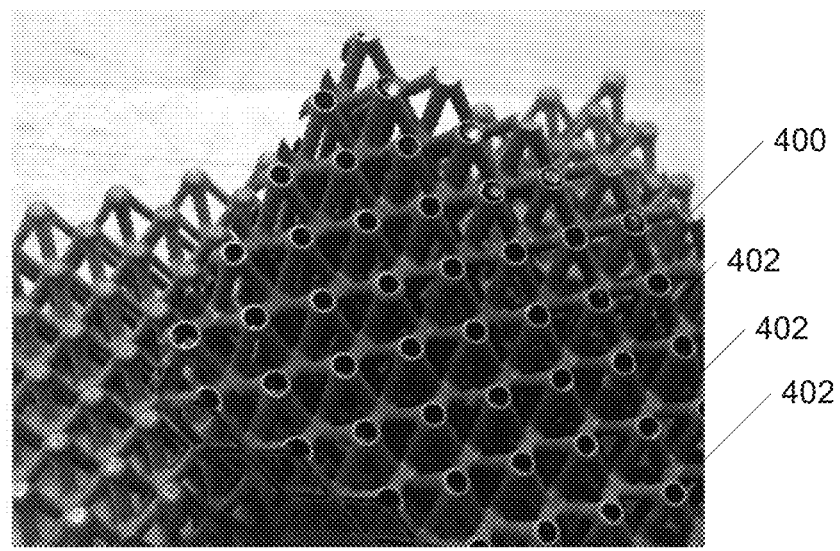
FIG. 4A conceptually illustrates a metalized hollow core truss panel in accordance with an embodiment of the invention.
Figure 4B:
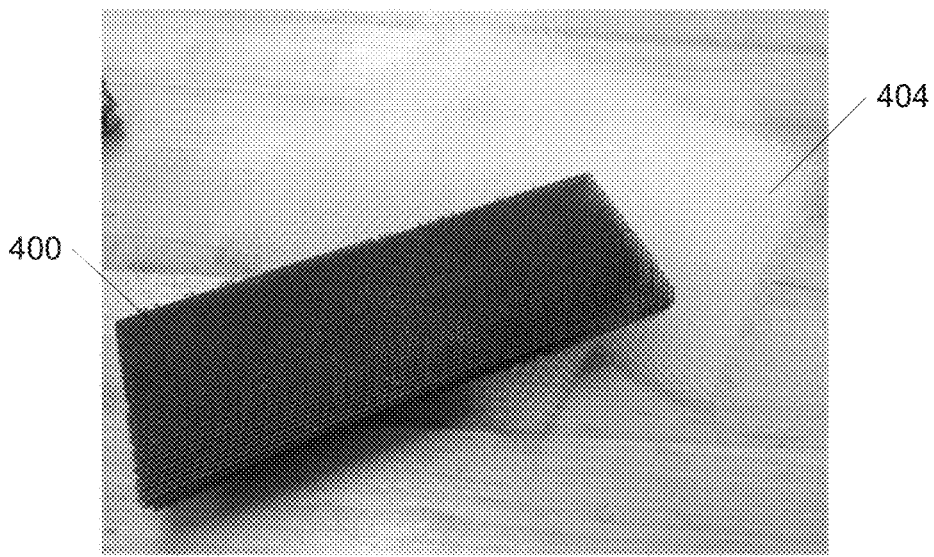
FIG. 4B conceptually illustrates a metalized core truss panel next to a polymer core truss panel in accordance with an embodiment of the invention.

After the sacrificial core truss panel is plated, the sacrificial core truss panel can be removed to leave behind a free-standing hollow core truss panel made of the plated material. In embodiments where the sacrificial core truss panel is to be removed, the plating process can be modified to not plate at least one area from which the byproducts of the removal process can escape. For example, in embodiments utilizing electroplating, coverings, such as but not limited to waxes, lacquers, and tape, can be used to prevent plating of at least one area of the sacrificial core truss panel to not be plated, preventing total encapsulation of the sacrificial core truss panel by the plating material. In other embodiments, the sacrificial core truss panel is completely encapsulated by the metal layer. The encapsulated sacrificial core truss panel can be sliced open to expose the sacrificial core truss panel, allowing removal access of the sacrificial core truss panel. Several methods can be used to remove the sacrificial core truss panel. In many embodiments, the sacrificial core truss panel is dissolved using a dissolving agent through the non-plated area. In other embodiments, the sacrificial core truss panel is etched off. In some embodiments, the sacrificial core truss panel is burned off. FIG. 4A conceptually illustrates a close up of a hollow metal core truss panel 400 in accordance with an embodiment of the invention. Nodes 402 show non-plated areas that allows for the byproducts of the removal of the sacrificial core truss panel to escape. A comparison between a hollow metal core truss panel 400 and a sacrificial core truss panel 404 in accordance with an embodiment of the invention is conceptually illustrated in FIG. 4B. In further embodiments, the hollow metal core truss panel is filled with a type of material. In still further embodiments, the space between the truss members is filled with a type of material. The filled material can be chosen to improve radiation shielding of the panel, ballistic performance of the panel, heat flow in the panel, or any other performance metric.

In a further embodiment, the sacrificial core truss panel can be fabricated using a pre-ceramic polymer that is converted into a ceramic through the application of heat. In other embodiments, the sacrificial polymer core truss panel is converted into carbon or graphite via pyrolysis, where the application of heat reduces the polymer into carbon. Instead of removing the sacrificial truss material, the conversion into carbon or ceramic creates a high-melting temperature, high-strength template which can be used to apply metal coatings in a method that would normally destroy a polymer. In another embodiment, the carbon or ceramic truss can be covered with metal through thermal spraying, sputtering, cold spraying, or direct immersion into molten metal followed by removal of excess. In a number of embodiments, the ceramic or carbon trusses is dipped into a molten metallic glass and then cooled rapidly to form complex, low-density metallic glass trusses. Regardless of the differences in the plating methods, the application of the current disclosure for integrating seamless features is the same.

Embedding Features

Figure 5A:
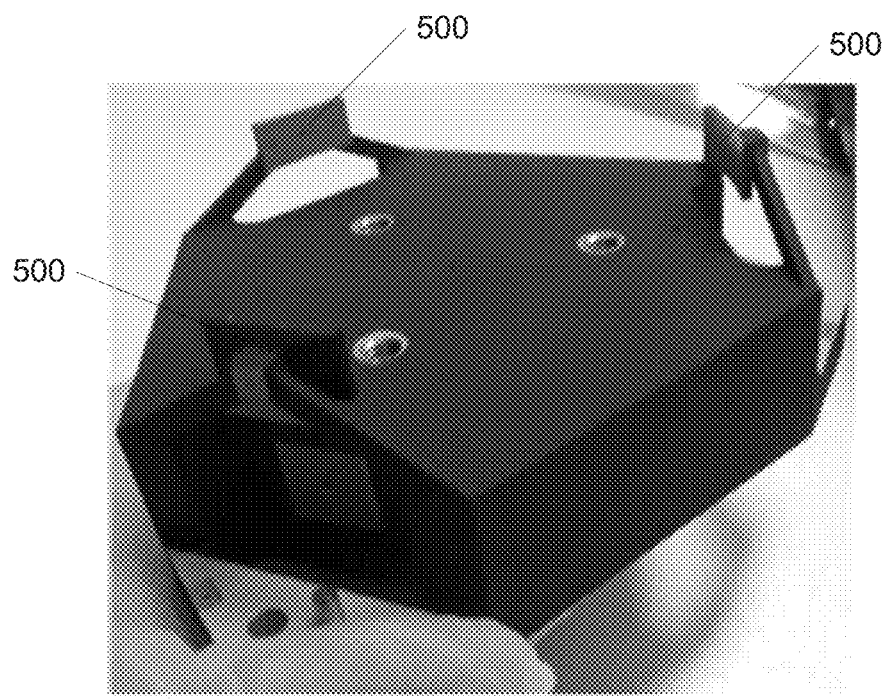
FIG. 5A illustrates a machined bipod flexure in accordance with an embodiment of the invention.
Figure 5B:
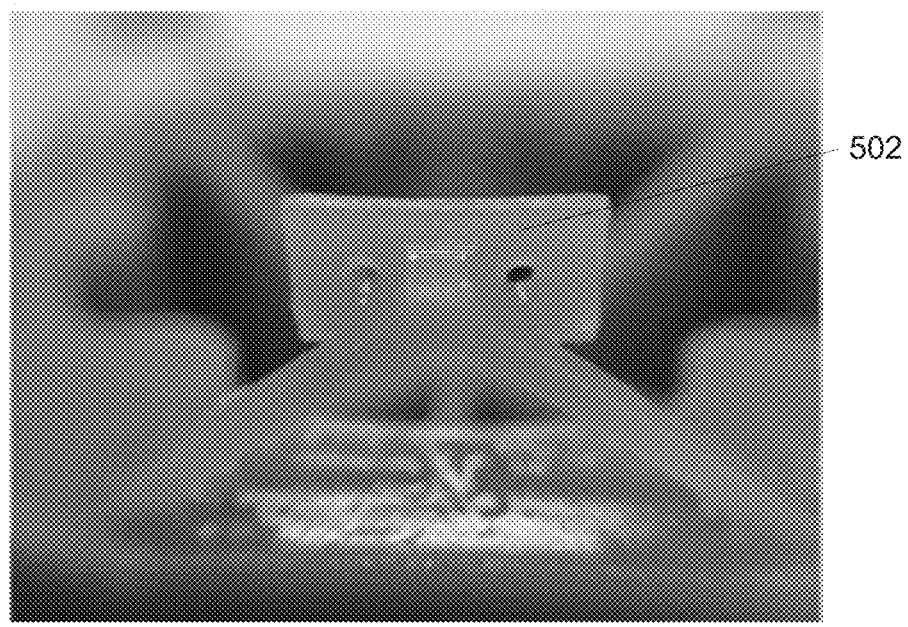
FIG. 5B conceptually illustrates a polymer bipod flexure fabricated seamlessly into a polymer core truss panel in accordance with an embodiment of the invention.
Figure 6A:
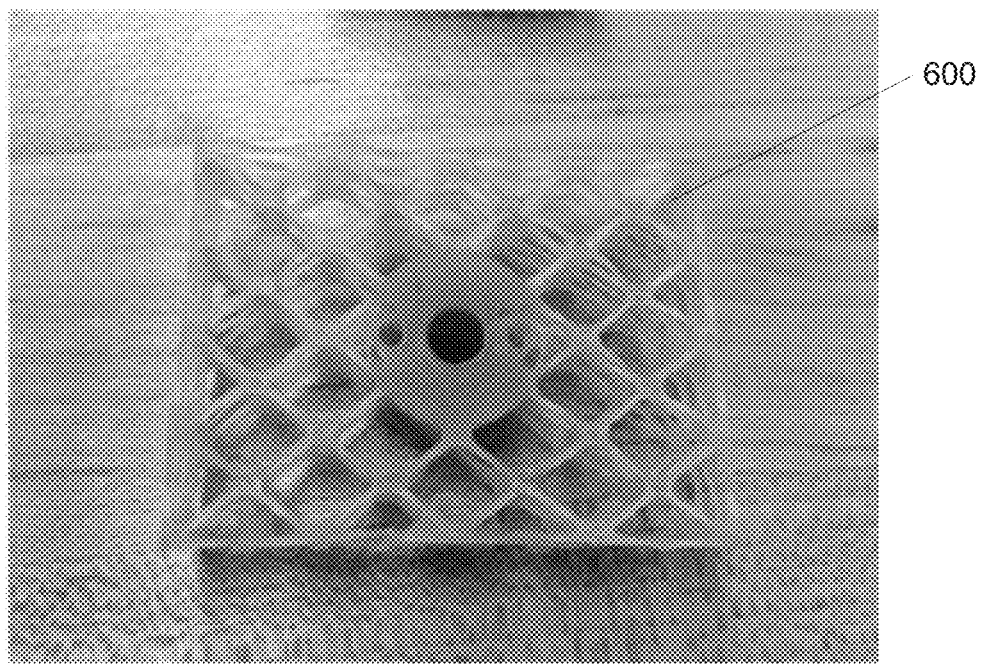
FIG. 6A conceptually illustrates a polymer core truss panel with a seamlessly embedded feature fabricated using a conventional 3D printing method in accordance with an embodiment of the invention.
Figure 6B:
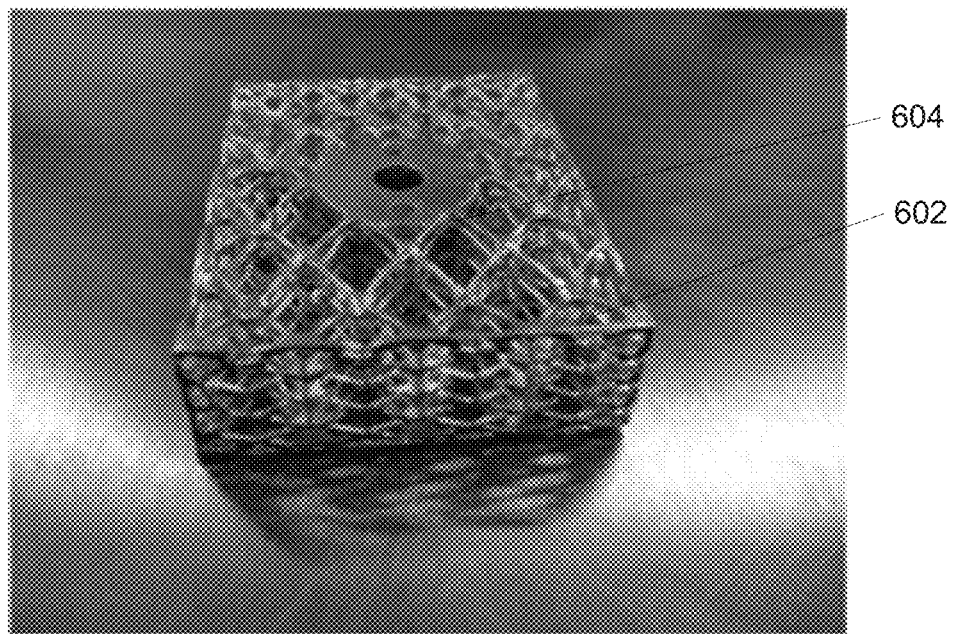
FIG. 6B conceptually illustrates a metallized core truss panel with a seamlessly embedded feature in accordance with an embodiment of the invention.

Features, such as but not limited to inserts, flexures, latches, hooks, bolts, and other fasteners, can be intimately embedded into metal core truss panels such that the features are seamlessly connected with the truss structure. This can be achieved using any number of methods including those described below. In many embodiments, the features are fabricated concurrently as part of the sacrificial core truss panel in a single printing operation, resulting in a seamless connection. For example, in embodiments utilizing computer aided design to fabricate the sacrificial core truss panel, such as but not limited to conventional three-dimensional printing and stereolithography, the design can incorporate the features as part of the sacrificial core truss panel. One type of feature that can be incorporated into the sacrificial core truss panel in accordance with an embodiment of the invention is conceptually illustrated in FIG. 5A-5B. FIG. 5A conceptually illustrates a machined insert with bipod flexures 500 that can be used to hold an optic. FIG. 5B conceptually illustrates the same bipod flexures 502 fabricated in polymer as part of the sacrificial core truss panel. After fabrication, the sacrificial core truss panel can be plated, which also results in the plating of the features, using any of the methods described above to produce a metal core truss panel with seamlessly embedded metal features. FIG. 6A-6B conceptually illustrates the visual differences between a polymer core truss panel 600 before the plating process and a metal core truss panel 602 after the plating process in accordance with an embodiment of the invention. In embodiments involving the removal of the sacrificial core truss panel, the seamlessly embedded features 604 can also be hollow after the removal process. The embedded feature could also be made of metal 208 and could be seamlessly embedded into a polymer truss before converting to metal or into a ceramic or carbon truss after conversion of the polymer. The metallizing of the truss would also add additional metal to an existing metal feature which would then be intimately connected to the truss after metallization.

Figure 7:
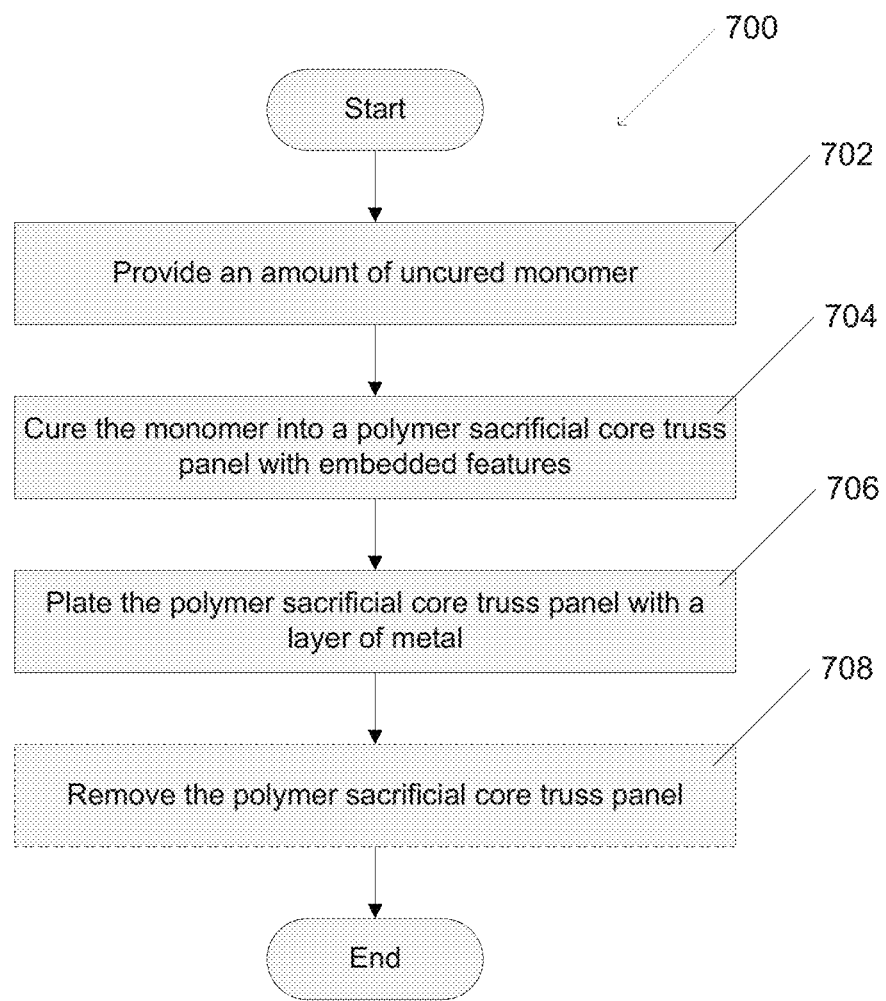
FIG. 7 conceptually illustrates a process of fabricating a metal core truss panel with a seamlessly embedded feature in accordance with an embodiment of the invention.

A process 700 that can be utilized to fabricate a metal core truss panel with seamlessly embedded features in accordance with an embodiment of the invention is conceptually illustrated in FIG. 7. Uncured monomer can be provided as raw materials for the fabrication process (702). The type of monomer provided can be chosen for its curing attributes and/or the resulting polymer's dissolving attributes. The uncured monomer can be cured into a sacrificial core truss panel made of polymer (704). The sacrificial core truss panel can be cured using a variety of methods depending on the monomer used. For example, if the monomer used is a photocurable monomer, a computer aided laser can be used to cure the monomer. The design followed by the computer aided laser can be a core truss panel with the feature included. The sacrificial core truss panel with the embedded feature can be plated with a layer of metal (706). Plating methods can include electroplating, electrolessly plating, and sputter coating. The method chosen can depend on the availability of resources, desired plating material, and desired thickness. After plating, the sacrificial core truss panel can optionally be removed (708). Removal of the sacrificial core truss panel requires the plating process to leave certain areas of the sacrificial core truss panel non-plated. Different types of coverings such as but not limited to waxes, lacquers, and tape can be used to designate an area to be non-plated. A number of methods such as but not limited to dissolving, etching, and burning can be used to remove the sacrificial core truss panel.

Although a specific process for fabricating a metal core truss panel with seamlessly embedded features is conceptually illustrated in FIG. 7, any of a variety of processes can be utilized as appropriate to the requirements of specific applications in accordance with an embodiment of the invention.

Because of the vast different speeds and design complexity among the fabricating methods, it is practicable to separately fabricate a smaller feature using a slower fabricating method, which typically allows for more complex designs, and to fabricate a regular core truss panel using a faster fabricating method. For example, self-propagating polymer waveguide methods allow for rapid fabrication of a core truss panel. However, these methods have limitations regarding the fabrication of complex features. A solution to this would be to fabricate a regular core truss panel using the fast self-propagating polymer waveguide method and to separately fabricate a feature using a slower fabrication method that allows for complex designs. The feature can be separately fabricated using any number of methods and can be made of any type of material, such as but not limited to polymers and metals. In some embodiments, the feature can be fabricated using conventional three-dimensional printing or stereolithography. In other embodiments, the feature is machined from a block of metal. The feature can later be inserted into the core truss panel before the plating process using any number of methods including those described below.

Figure 8:
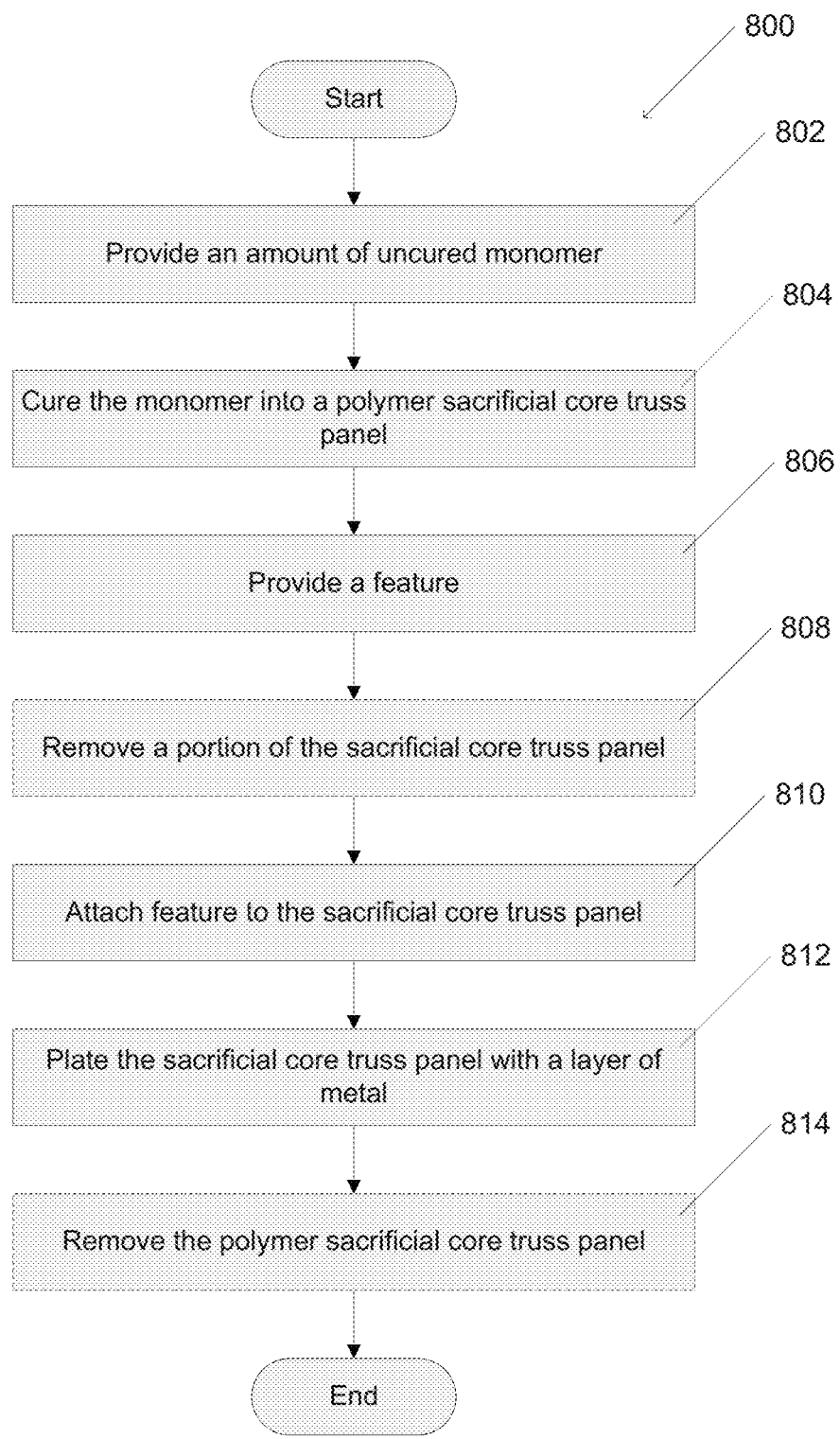
FIG. 8 conceptually illustrates a process 800 for fabricating a metal core truss using separately fabricated core truss panels and features in accordance with an embodiment of the invention FIG. 9 conceptually illustrates how a smaller core truss panel with an embedded feature can be combined with a larger core truss panel prior to metallization in accordance with an embodiment of the invention.

FIG. 8 conceptually illustrates a process 800 for fabricating a metal core truss using separately fabricated core truss panels and features in accordance with an embodiment of the invention. Uncured monomer can be provided as raw materials for the fabrication process (802). The uncured monomer can be cured into a sacrificial core truss panel made of polymer (804). A feature can be provided (806). Features can be made of a variety of materials and can include a variety of devices performing different functions. Features can also be fabricated using a variety of methods. Some features can be an embedded feature in a smaller truss. The truss can include truss members that have substantially similar diameters to the truss members of the sacrificial core truss panel. A portion of the sacrificial core truss panel can optionally be removed (808). Depending on how the sacrificial core truss panel was fabricated and the characteristics of the feature, a portion of the sacrificial core truss panel can be removed to create a space for receiving the feature. The feature can be attached to the sacrificial core truss panel (810). A variety of methods can be used to attach the feature to the sacrificial core truss panel. The feature can be bonded to the sacrificial core truss panel with heat, epoxy, or adhesion to cured polymer. The feature can also simply be set in sacrificial core truss panel without any additional bonding. The sacrificial core truss panel can be plated with a layer of metal (812). The sacrificial core truss panel can optionally be removed (814).

Although a specific process for fabricating metal core truss using separately fabricated core truss panels and features is conceptually illustrated in FIG. 8, any of a variety of processes can be utilized as appropriate to the requirements of specific applications in accordance with an embodiment of the invention.

Figure 9:
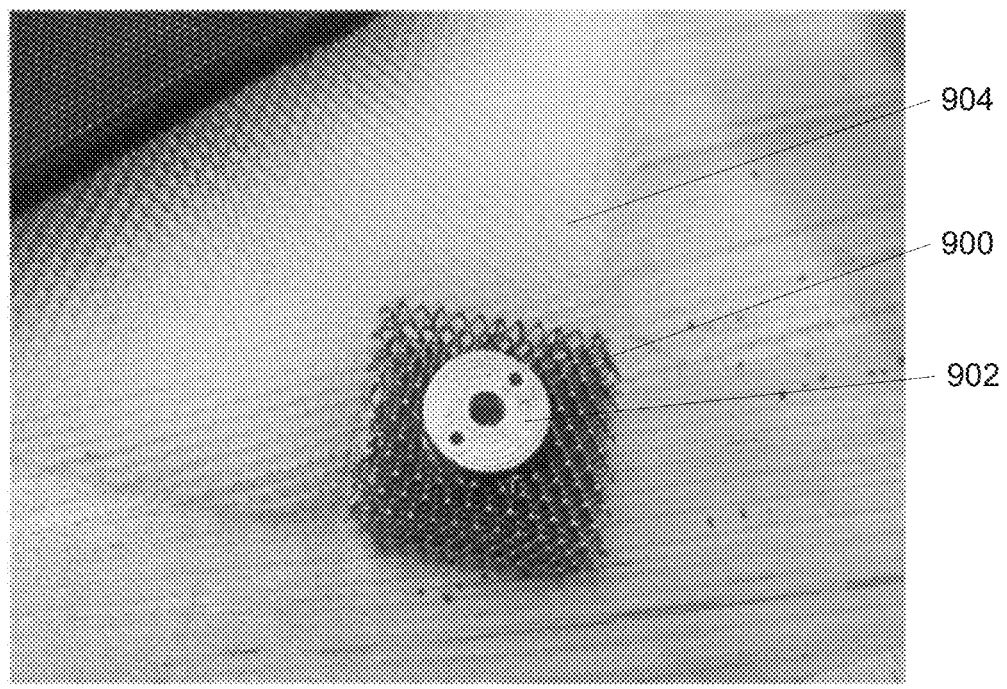

In many embodiments, a separately fabricated feature can be embedded during the fabrication process of the sacrificial core truss panel. For example, in embodiments utilizing stereolithography in the fabrication of the sacrificial core truss panel, the separately fabricated feature can be inserted in the middle of the fabrication process and the monomer can be cured around the feature, embedding the feature into the sacrificial core truss panel. In some embodiments, a separately fabricated feature can be embedded after the fabrication of a sacrificial core truss panel. A section of the fabricated sacrificial core truss panel can be removed and the separately fabricated feature can be inserted and bonded to the empty space in the sacrificial core truss panel. The separately fabricated feature can be bonded to the sacrificial core truss panel using any number of bonding methods, such as but not limited to epoxy, heat, and tape. In a number of embodiments, a feature can be fabricated into a smaller truss with the same geometry as the larger sacrificial core truss panel. An appropriately sized section can then be excised from the larger sacrificial core truss panel and the smaller truss can be inserted. After the sacrificial core truss panel is embedded with a feature using any of the methods described above, the sacrificial core truss can be plated using any of the methods described above to produce a metal core truss panel with seamlessly embedded features. In many such embodiments the separately fabricated feature may itself be made of metal and then further coated with metal to seamlessly interconnect with the rest of the core truss. FIG. 9 conceptually illustrates a smaller truss 900 with an embedded insert 902 in accordance with an embodiment of the invention. The smaller truss 900 can include truss members having substantially similar diameters as the truss members of the larger sacrificial core truss panel 904. The similar sized diameters allows for a smooth connection after plating.

In embodiments involving the removal of the sacrificial core truss, the separately fabricated and embedded feature can either be removed or left in the metal core truss panel depending on the type of material used in the fabrication of the feature and the metal core truss panel's purpose of use. For example, in many embodiments, the separately fabricated feature is made of the same polymer as the sacrificial core truss panel. Removal of the sacrificial core truss panel will typically also remove the separately fabricated feature, leaving behind a free-standing hollow core truss panel with a seamlessly embedded hollow feature. In other embodiments, the separately fabricated feature is made of a material that is difficult to remove, such as but not limited to a type of metal. In those cases, the plated feature can remain and provide further structural support, improve radiation shielding, or any other purpose.

Figure 10:
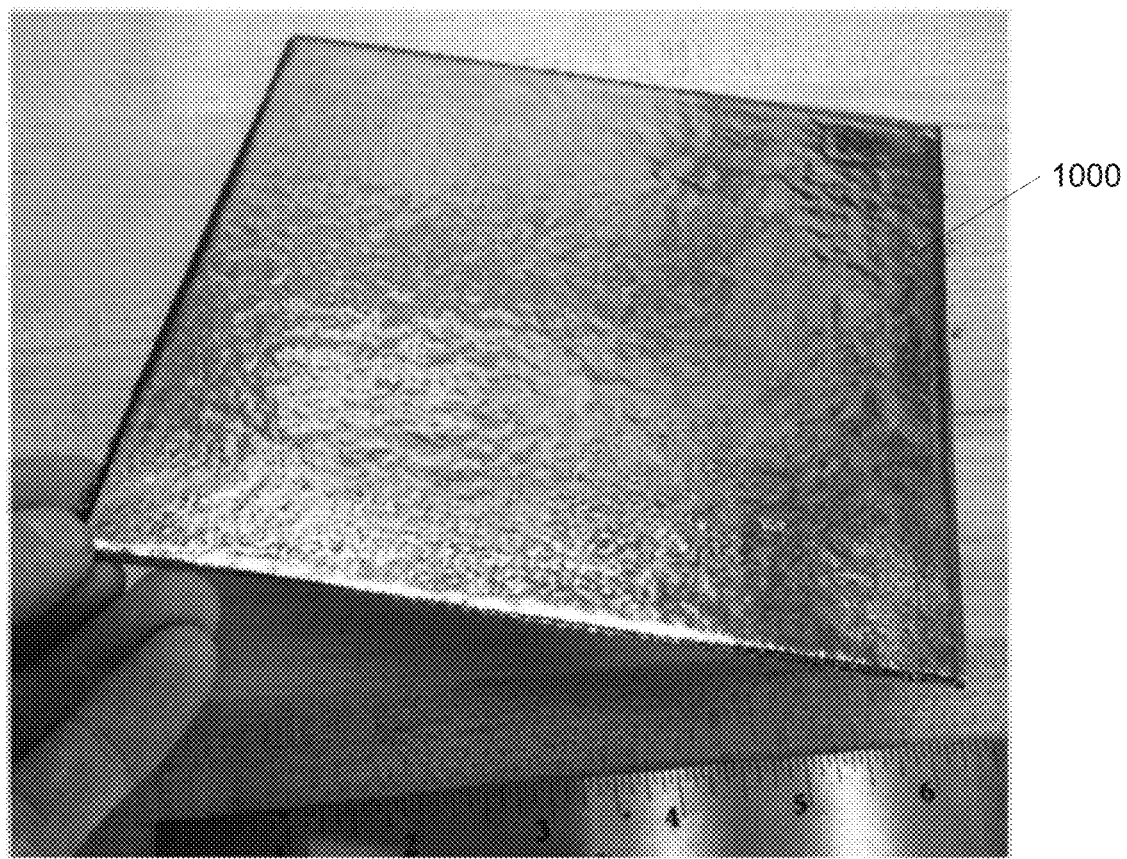
FIG. 10 conceptually illustrates a face sheet that can be combined with a metal core truss panel in accordance with an embodiment of the invention.

In many embodiments, a feature is inserted into a metal core truss panel by drilling a hole in the panel and bonding the feature into the hole using the severed walls of the truss as nodes for bonding the insert. In some embodiments, the metal core truss panel is attached to face sheet panels. FIG. 10 conceptually illustrates a face sheet panel 1000 made of a metallic glass laminate material in accordance with an embodiment of the invention. A feature can be inserted by drilling a hole through the face sheet panel into the metal core truss panel and the feature includes hooks or expanding features that extend beyond the outer perimeter of the drilled hole into the space between the truss walls to allow for latching and prevention of "pull-out."

Although specific methods of fabricating a metal core truss panel with seamlessly embedded features are discussed above, many different fabrication methods can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for producing a metal core truss panel composite, the method comprising:
   interconnecting a plurality of sacrificial core truss members to fabricate a sacrificial panel,
      wherein each sacrificial core truss member of the plurality of sacrificial core truss members is interconnected with at least one other sacrificial core truss member, such that the plurality of sacrificial core truss members forms an ordered three-dimensional sacrificial core truss structure characterized by a regular pattern;
      embedding at least one feature distinct from any sacrificial core truss member of the plurality of sacrificial core truss members and any part thereof to the sacrificial panel, wherein the embedded at least one feature does not conform with the regular pattern of the sacrificial core truss structure and provides a connection point for interconnecting with an external object; and
   plating the ordered three-dimensional sacrificial core truss structure and the embedded at least one feature with a layer of a metal to form a metal panel comprising a plurality of metal truss members and at least one seamlessly embedded metal feature, wherein the at least one seamlessly embedded metal feature allows interconnecting of the external object with the metal panel at the same connection point.

2. The method of claim 1, wherein interconnecting the plurality of sacrificial core truss members and embedding the at least one feature further comprises:

providing an amount of uncured monomer;

shaping and interconnecting the amount of uncured monomer into the plurality of sacrificial core truss members and the at least one feature embedded thereon; and curing the amount of uncured monomer into a cured polymer, wherein the cured polymer forms the sacrificial panel and the at least one feature embedded thereon.

3. The method of claim 2, further comprising removing the cured polymer after the plating to form a hollow metal panel comprising a plurality of hollow metal truss members and at least one seamlessly embedded hollow metal feature.

4. The method of claim 1, wherein at least one of the at least one seamlessly embedded metal feature is selected from the group consisting of an insert, a flexure, a latch, a hook, a fastener, a cabling, a fin, a screw device, and a bolting device.

5. The method of claim 1, wherein the at least one feature comprises a set of screw threads that are smaller than a desired size, such that after the plating the at least one seamlessly embedded metal feature comprises a set of metal screw threads with the desired size.

6. The method of claim 1, wherein the plating is conducted using a method selected from the group consisting of: electroplating, electrolessly plating, and sputtering.

7. The method of claim 1, further comprising filling a plurality of interstitial voids between the plurality of metal truss members with a material different from the metal used in the plating.

8. The method of claim 3, further comprising filling the inside of the plurality of hollow metal truss members and the at least one seamlessly embedded functional hollow metal feature with a material different from the metal used in the plating.

9. The method of claim 1, further comprising attaching a face sheet to the metal panel, wherein the face sheet defines an opening that allows access to the at least one seamlessly embedded metal feature.

10. The method of claim 9, wherein the face sheet comprises a carbon fiber laminate material.

11. The method of claim 10, wherein the carbon fiber laminate material comprises at least one embedded layer of metallic glass.

12. The method of claim 9, wherein the face sheet comprises a material selected from the group consisting of: a metallic glass, a monolithic metal, and a metal alloy.

13. The method of claim 12, wherein the monolithic metal is selected from the group consisting of: Al, Ti, W, Mo, Ta, V, Ni, Cu, Nb, and Fe.

14. The method of claim 1, wherein the sacrificial panel is curved.

15. The method of claim 1, further comprising converting the sacrificial panel into one of either a ceramic or a carbon material prior to the plating.

16. The method of claim 15, wherein the plating is conducted using a method selected from the group consisting of: sputtering, thermal spraying, cold spraying, and liquid immersion.

17. The method of claim 16, wherein the metal used in the plating comprises metallic glass.

* * * * *